US011042925B2

(12) United States Patent
Cooper et al.

(10) Patent No.: US 11,042,925 B2
(45) Date of Patent: *Jun. 22, 2021

(54) MATCHING TECHNIQUES FOR DATA TRANSACTION REQUESTS WITH PRIVATE ATTRIBUTES

(71) Applicant: Nasdaq, Inc., New York, NY (US)

(72) Inventors: Steven Cooper, New York, NY (US); Joseph Noviello, New York, NY (US); Leo Golubovsky, Franklin Lakes, NJ (US); Chung-Sin Wang, Ridgewood, NY (US); Matthew Claus, New York, NY (US)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,236

(22) Filed: Jun. 29, 2020

(65) Prior Publication Data

US 2020/0327605 A1    Oct. 15, 2020

Related U.S. Application Data

(63) Continuation of application No. 15/200,971, filed on Jul. 1, 2016, now Pat. No. 10,740,827.

(60) Provisional application No. 62/188,451, filed on Jul. 2, 2015, provisional application No. 62/213,970, filed on Sep. 3, 2015.

(51) Int. Cl.
*G06Q 40/00* (2012.01)
*G06Q 40/04* (2012.01)
*G06Q 30/06* (2012.01)
*G06Q 30/08* (2012.01)

(52) U.S. Cl.
CPC ......... *G06Q 30/0633* (2013.01); *G06Q 30/08* (2013.01); *G06Q 40/04* (2013.01)

(58) Field of Classification Search
CPC ...................................................... G06Q 40/00
USPC .......................................................... 705/35
See application file for complete search history.

(56) References Cited

U.S. PATENT DOCUMENTS 5,761,442 A * 6/1998 Barr .................... G06N 3/0454
    705/36 R
6,026,381 A * 2/2000 Barton, III ............. G06Q 40/06
    705/36 R (Continued)

OTHER PUBLICATIONS

Office Action in U.S. Appl. No. 15/200,902, dated Dec. 12, 2018, 11 pages.

(Continued)

*Primary Examiner* — Kirsten S Apple
(74) *Attorney, Agent, or Firm* — Nixon & Vanderhye P.C.

(57) ABSTRACT

A computer system is provided that includes a paired list of data transaction requests on which a matching process is performed. There are multiple different types of data transaction requests that are stored in the paired list including data transaction requests with midpoint attributes and data transaction requests with discretion attributes. The computer system may determine how the multiple different types of data transaction requests may be match against each other. Two matching processes can be used to determine if a match exists between the first and second sides of the paired list. Matches that are determined at private values are not disseminated to third-parties via public market data feeds.

20 Claims, 11 Drawing Sheets

(56) References Cited

U.S. PATENT DOCUMENTS

| | | | | |
|---|---|---|---|---|
| 6,278,982 B1 * | 8/2001 | Korhammer | G06Q 40/04 | 705/36 R |
| 6,829,589 B1 * | 12/2004 | Saliba | G06Q 40/00 | 705/35 |
| 6,996,539 B1 * | 2/2006 | Wallman | G06Q 40/10 | 705/36 T |
| 6,999,829 B2 * | 2/2006 | Bazzocchi | G06Q 10/06 | 700/99 |
| 6,999,877 B1 * | 2/2006 | Dyer | G06Q 10/00 | 702/2 |
| 6,999,935 B2 * | 2/2006 | Parankirinathan | G06Q 40/00 | 705/35 |
| 6,999,936 B2 * | 2/2006 | Sehr | G07F 7/0873 | 705/5 |
| 6,999,937 B1 * | 2/2006 | Peters | G06Q 10/06395 | 705/7.21 |
| 6,999,938 B1 * | 2/2006 | Libman | G06Q 10/10 | 705/14.1 |
| 6,999,941 B1 * | 2/2006 | Agarwal | G06Q 30/06 | 705/26.2 |
| 6,999,942 B2 * | 2/2006 | Kemper | G06Q 40/00 | 705/35 |
| 7,003,472 B2 * | 2/2006 | Sachdeva | G06F 19/3481 | 705/2 |
| 7,003,473 B2 * | 2/2006 | Curtis | G06Q 30/0201 | 705/7.29 |
| 7,003,474 B2 * | 2/2006 | Lidow | G06Q 10/02 | 705/7.31 |
| 7,003,475 B1 * | 2/2006 | Friedland | G06Q 10/06 | 705/7.13 |
| 7,003,476 B1 * | 2/2006 | Samra | G06Q 10/0635 | 705/7.28 |
| 7,003,477 B2 * | 2/2006 | Zarrow | G06Q 10/063 | 705/7.41 |
| 7,003,478 B1 * | 2/2006 | Choi | G06Q 30/02 | 705/14.73 |
| 7,003,487 B2 * | 2/2006 | Skirpa | G06Q 10/00 | 705/35 |
| 7,006,995 B1 * | 2/2006 | Edenson | G11B 20/00086 | 380/201 |
| 7,006,996 B2 * | 2/2006 | Hasegawa | G06Q 30/06 | 348/E7.071 |
| 7,006,997 B2 * | 2/2006 | Hori | G06F 21/10 | 705/57 |
| 7,006,998 B2 * | 2/2006 | Granfeldt | G06Q 20/341 | 705/317 |
| 7,006,999 B1 * | 2/2006 | Huberman | G06Q 10/10 | 705/50 |
| 7,007,000 B2 * | 2/2006 | Engelhart | G06Q 20/02 | 705/44 |
| 7,007,014 B2 * | 2/2006 | Liu | G06Q 30/02 | 707/758 |
| 7,010,503 B1 * | 3/2006 | Oliver | H04L 67/2833 | 705/4 |
| 7,181,423 B2 * | 2/2007 | Blanchard | G06Q 40/00 | 705/35 |
| 9,754,322 B1 * | 9/2017 | Keith | G05B 15/02 | |
| 2002/0091617 A1 | 7/2002 | Keith | | |
| 2006/0206407 A1 * | 9/2006 | Troxel, Jr. | G06Q 40/025 | 705/37 |
| 2009/0132412 A1 * | 5/2009 | Cleary Neubert | G06Q 40/00 | 705/37 |
| 2011/0264577 A1 * | 10/2011 | Winbom | G06Q 40/04 | 705/37 |
| 2015/0073962 A1 * | 3/2015 | Bixby | G06Q 40/04 | 705/37 |
| 2015/0073963 A1 * | 3/2015 | Kane | G06Q 40/04 | 705/37 |
| 2016/0078537 A1 | 3/2016 | Katsuyama et al. | | |
| 2017/0004563 A1 | 1/2017 | Noviello | | |
| 2017/0004578 A1 * | 1/2017 | Cooper | G06Q 40/04 | |
| 2017/0083918 A1 | 3/2017 | Atkins | | |

OTHER PUBLICATIONS

Notice of Allowance in U.S. Appl. No. 15/200,902, dated Apr. 9, 2019, 13 Pages.

Corrected Notice of Allowability in U.S. Appl. No. 15/200,902 dated Jun. 10, 2019, 4 pages.

Mastercard International Incorporated; researchers submit patent application, "transaction control", for approval (USPTO 20170083918). (Apr. 13, 2017). Politics Government Week Retrieved from <https://search.proquest.com/docview/1884604336?accountid=14753>, 5 pages.

* cited by examiner

Example Order Book
- Screen Tick: 1
- Discretion Tick: .5
- Minimum Block Size For Mid or Discretion Match: 100
- Minimum Order Size For Mid or Discretion : 100

Fig. 2A

Side X (Bid) Of Electronic Order Book

|     | Price | Displayed Size | Total Size | Discretion Ticks | Attribute | Timestamp | Limit |
|-----|-------|----------------|------------|------------------|-----------|-----------|-------|
| 203 | *     |                | 400        |                  | Midpoint  | 6         | 102   |
| 201 | 100   | 25             | 500        | 2                | Discretion| 8         |       |
| 202 | 100   | 50             | 500        | 1                | Discretion| 1         |       |
| 204 | 100   | 10             | 50         |                  |           | 3         |       |
| 205 | 100   | 50             | 50         |                  |           | 4         |       |

200

Side Y (Offer) Of Electronic Order Book

|     | Price | Displayed Size | Total Size | Discretion Ticks | Attribute  | Timestamp | Limit |
|-----|-------|----------------|------------|------------------|------------|-----------|-------|
| 212 | 102   | 25             | 1000       | 1                | Discretion | 7         |       |
| 211 | 102   | 50             | 50         |                  |            | 2         |       |

210

New Order (Offer)

| Price | Displayed Size | Total Size | Discretion Ticks | Attribute | Timestamp | Limit |
|---|---|---|---|---|---|---|
| 220 | | | | | | |
| | 102 | 75 | 1500 | 3 | Discretion | 9 |

New Order (Offer)

| Price | Displayed Size | Total Size | Discretion Ticks | Attribute | Timestamp | Limit |
|---|---|---|---|---|---|---|
| 230 | | | | | | |
| | 100 | 75 | 75 | | | 10 |

New Order (Bid)

| Price | Displayed Size | Total Size | Discretion Ticks | Attribute | Timestamp | Limit |
|---|---|---|---|---|---|---|
| 240 | | | | | | |
| | 101 | 1000 | 1000 | | | 11 |

New Order (Offer)

| Price | Displayed Size | Total Size | Discretion Ticks | Attribute | Timestamp | Limit |
|---|---|---|---|---|---|---|
| 250 | | | | | | |
| | * | | 1000 | | Midpoint | 12 |

New Order (Offer)

| Price | Displayed Size | Total Size | Discretion Ticks | Attribute | Timestamp | Limit |
|---|---|---|---|---|---|---|
| 260 | | | | | | |
| | 101 | 75 | 1500 | 1 | Discretion | 13 | 100 |

Fig. 2B

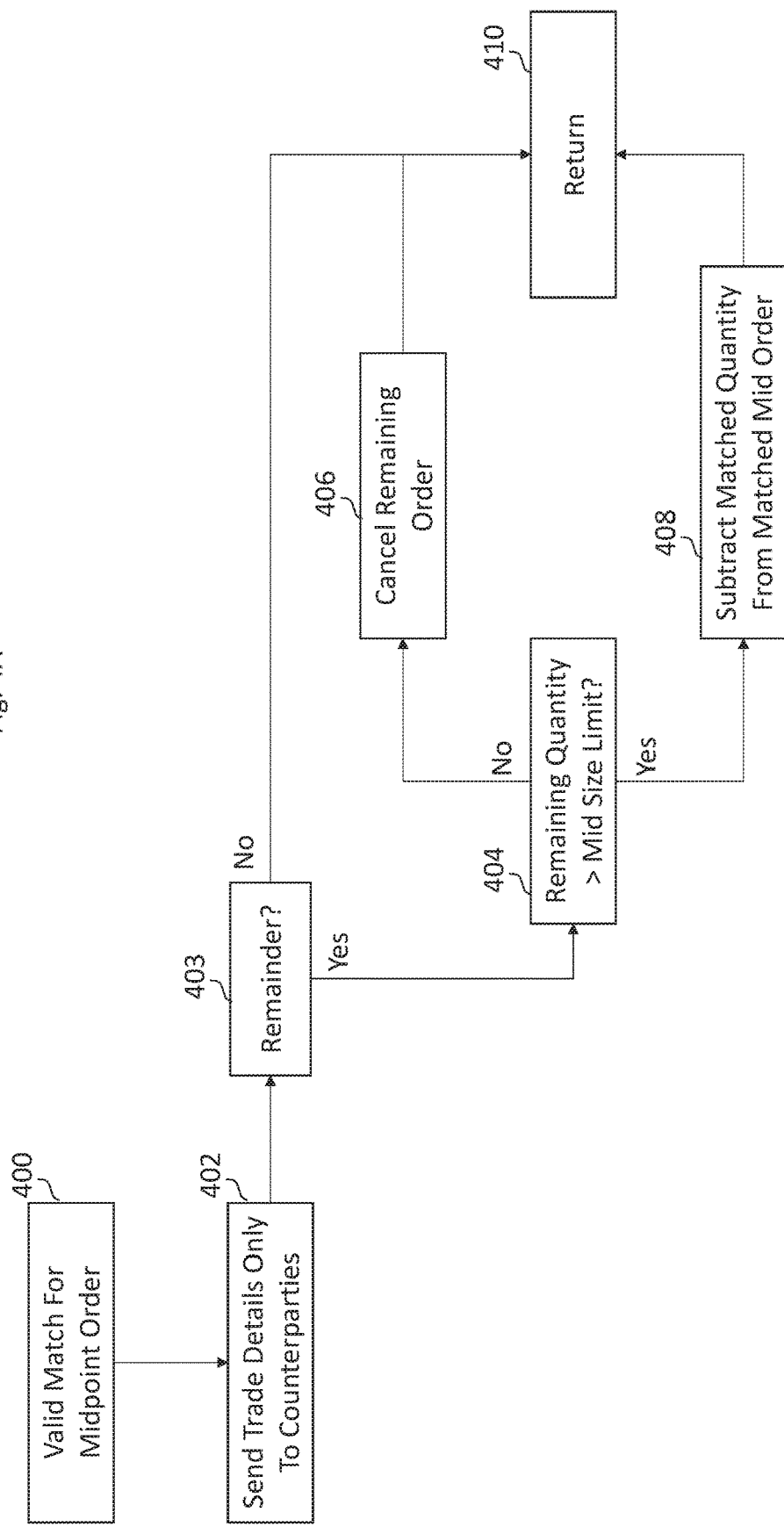

Fig. 8A

Example Order Book
- Screen Tick: 1
- Discretion Tick: .5
- Minimum Block Size For Mid or Discretion Match: 100
- Minimum Order Size For Mid or Discretion: 100

Side X (Bid) Of Electronic Order Book

|  | Price | Displayed Size | Total Size | Discretion Ticks | Attribute | Timestamp | Limit | Elect | Client Type |
|---|---|---|---|---|---|---|---|---|---|
| 803 | *(101) | | 400 | | Midpoint | 6 | 102 | 3, 15 | 1 |
| 801 | 100 | 25 | 500 | 2 | Discretion | 8 | | 2 | 1 |
| 802 | 100 | 50 | 500 | 1 | Discretion | 1 | | | 1 |
| 804 | 100 | 10 | 50 | | | 3 | | | 4 |
| 805 | 100 | 50 | 50 | | | 4 | | | 3 |

{ 800

Side Y (Offer) Of Electronic Order Book

|  | Price | Displayed Size | Total Size | Discretion Ticks | Attribute | Timestamp | Limit | Elect | Client Type |
|---|---|---|---|---|---|---|---|---|---|
| 812 | 102 | 100 | 1000 | 1 | Discretion | 7 | | 1, 16 | 2 |
| 811 | 102 | 50 | 50 | | | 2 | | | 1 |

New Order (Offer)

| | Price | Displayed Size | Total Size | Discretion Ticks | Attribute | Timestamp | Limit | Elect | Client Type |
|---|---|---|---|---|---|---|---|---|---|
| 820 | 101 | 75 | 1500 | 1 | Discretion | 9 | | 1 | 2 |

New Order (Offer)

| | Price | Displayed Size | Total Size | Discretion Ticks | Attribute | Timestamp | Limit | Elect | Client Type |
|---|---|---|---|---|---|---|---|---|---|
| 830 | 101 | 100 | 500 | | | 9 | | | 1 |

New Order (Bid)

| | Price | Displayed Size | Total Size | Discretion Ticks | Attribute | Timestamp | Limit | Elect | Client Type |
|---|---|---|---|---|---|---|---|---|---|
| 840 | 102 | 500 | 500 | | | 9 | | | 1 |

New Order (Bid)

| | Price | Displayed Size | Total Size | Discretion Ticks | Attribute | Timestamp | Limit | Elect | Client Type |
|---|---|---|---|---|---|---|---|---|---|
| 850 | 102 | 500 | 500 | | | 9 | | | 2 |

New Order (Bid)

| | Price | Displayed Size | Total Size | Discretion Ticks | Attribute | Timestamp | Limit | Elect | Client Type |
|---|---|---|---|---|---|---|---|---|---|
| 860 | 102 | 100 | 500 | | | 9 | | 1 | 1 |

MATCHING TECHNIQUES FOR DATA TRANSACTION REQUESTS WITH PRIVATE ATTRIBUTES

CROSS REFERENCE TO RELATED APPLICATION(S)

This application is a continuation of U.S. patent application Ser. No. 15/200,971, filed Jul. 1, 2016, now allowed; which claims the benefit of U.S. Patent Application No. 62/188,451, filed Jul. 2, 2015 and U.S. Patent Application No. 62/213,970, filed Sep. 3, 2015, the entire contents of each being incorporated herein by reference.

TECHNICAL OVERVIEW

The technology herein relates to computing systems that match data transaction requests. More particularly, the technology herein relates to matching different types of data transaction requests that include private attributes.

INTRODUCTION

In computing technology, different kinds of data transaction requests may be individually handled by different processes (or threads). Each process may be programmed to handle the characteristics or attributes particular that type of data transaction request. For example, each data transaction request type may have a corresponding dual-sided sorted list that is used to match data transaction requests between the two sides. A data transaction request of type "X" can then be matched against other similarly situated type "X" data transaction requests that are present in the dual-sided sorted list. The segmentation of how each type of data transaction request is processed may be advantageous because the matching process for each type may only need to account for matching one type of data transaction request (e.g., A to A and separately B to B). The process segmentation allows for easier expandability of a system as one can add new processes to handle new types of data transaction requests without affecting how the other processes operate.

However, a potential downside to this type of implementation is that there is generally no possibility of matching between the different types of data transaction requests (e.g., A to B). This may be problematic when there are few data transaction requests of one type and more of another (or even worse, few of all types).

Accordingly, in these, and other areas of computing technology, new techniques are continually sought after. In particular, techniques for how the processes performed by computer systems may be programmed to handle processing multiple different types of data transaction requests in a unified manner. Such techniques may be used to organize electronic order books and perform data transaction request matching for data transaction requests that have different attributes.

SUMMARY

In certain example embodiments, a computer system creates, updates, and maintains a single two-sided order list that includes different data transaction request types. The different types of data transaction requests include midpoint type data transaction requests and discretion type data transaction requests. Both of these types have private (hidden) attributes that can affect how the corresponding data transaction request is sorted into the ordered list and/or how the data transaction request is matched against other data transaction requests. In certain example embodiments, regular data transaction requests (e.g., those with no private attributes) are also received and processed.

The features described herein may be combined to form additional embodiments and sub-elements of certain embodiments may form yet further embodiments. This summary is provided to introduce a selection of concepts that are further described below in the detailed description. This summary is intended neither to identify key features or essential features of the claimed subject matter, nor to be used to limit the scope of the claimed subject matter; rather, this summary is intended to provide an overview of the subject matter described in this document. Accordingly, it will be appreciated that the above-described features are merely examples, and that other features, aspects, and advantages of the subject matter described herein will become apparent from the following detailed description, figures, and claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 2A shows an illustrative non-limiting example of two sides of an example electronic order book that includes different order types;

FIG. 2B shows multiple different example new incoming orders that may be processed against the example order book shown in FIG. 2A;

FIG. 4A is a flow chart showing example post-processing for orders that are matched and have the mid attribute;

FIG. 8A shows an illustrative non-limiting example of two sides of an example electronic order book that includes different order types; and FIG. 8B shows multiple different example new incoming that may be processed against the example order book shown in FIG. 8A.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain example embodiments, a computer system is a computer-implemented trading exchange system (exchange) that stores two sorted lists (also referred to as an "order book") of received data transaction requests (also referred to as "orders" herein). Certain example embodiments relate to incorporating one or more (e.g., two or more) different data transaction request types into a single electronic order book (e.g., per instrument). In certain examples, this may include combining wholesale order types with regular "retail" order types. These different order types may be matched against one another. The different types of data transaction requests include discretion orders ("discretion") and midmarket block orders ("mid" or "midpoint") that may be added to a single electronic order book that also includes retail orders (e.g., those orders with information published to third parties and generally available to any counter party customer).

Figure 1:
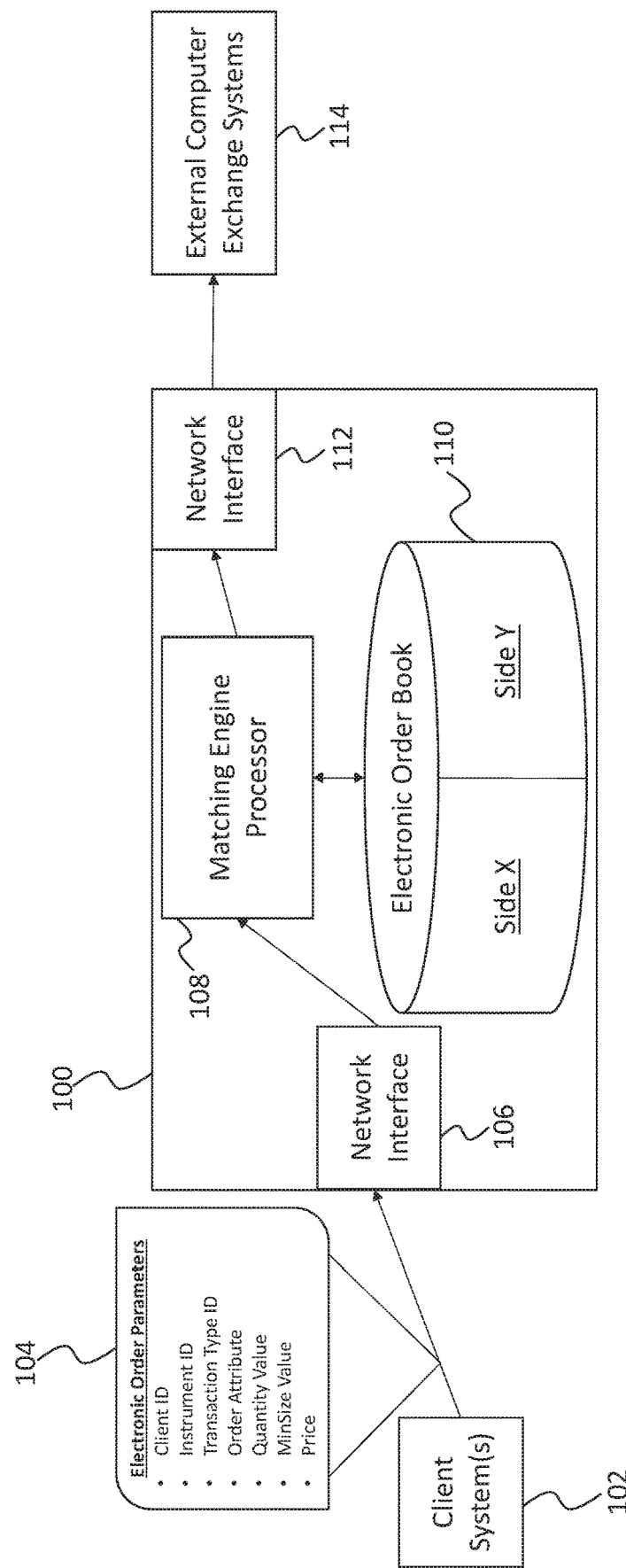
FIG. 1 illustrates a non-limiting example function block diagram of a computer-implemented exchange system that implements an example order book according to certain example embodiments.
Figure 4B:
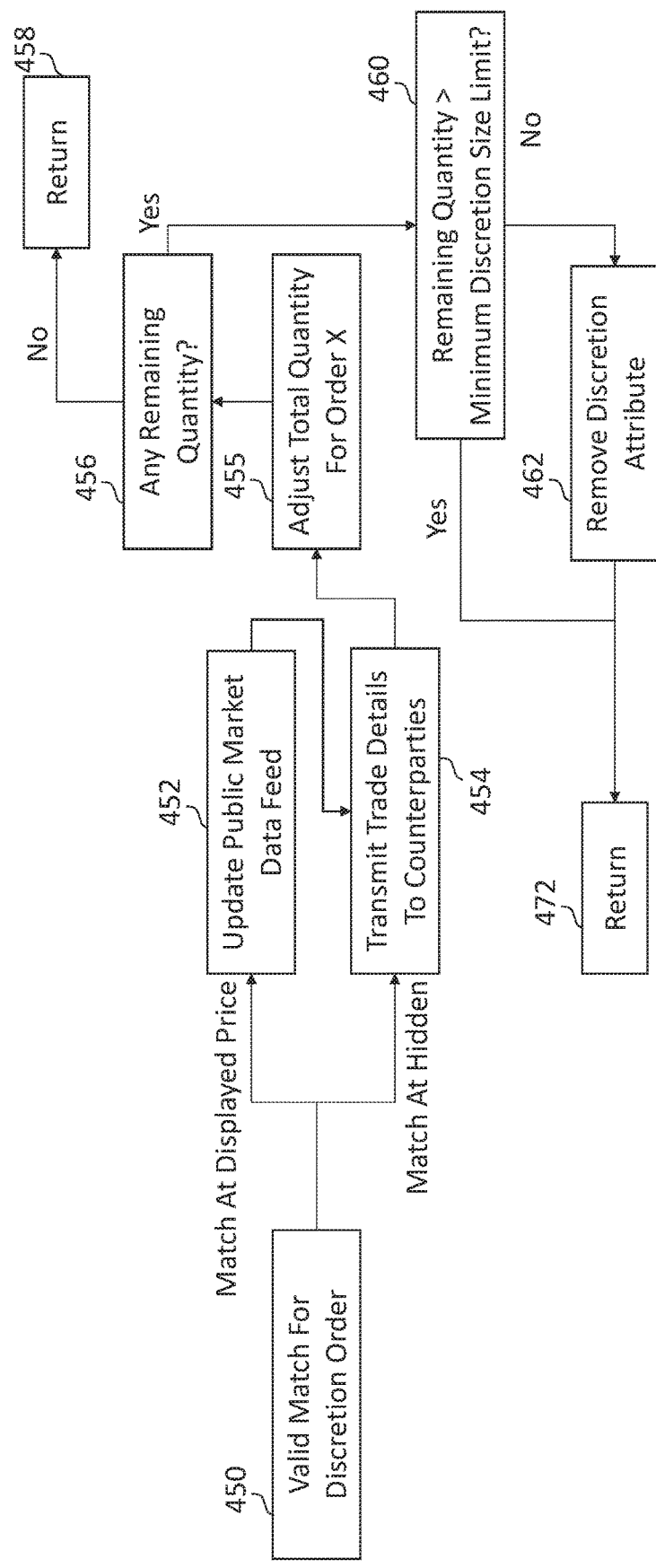
FIG. 4B is a flow chart showing example post-processing for orders that are matched and have the private discretion attribute.
Figure 5:
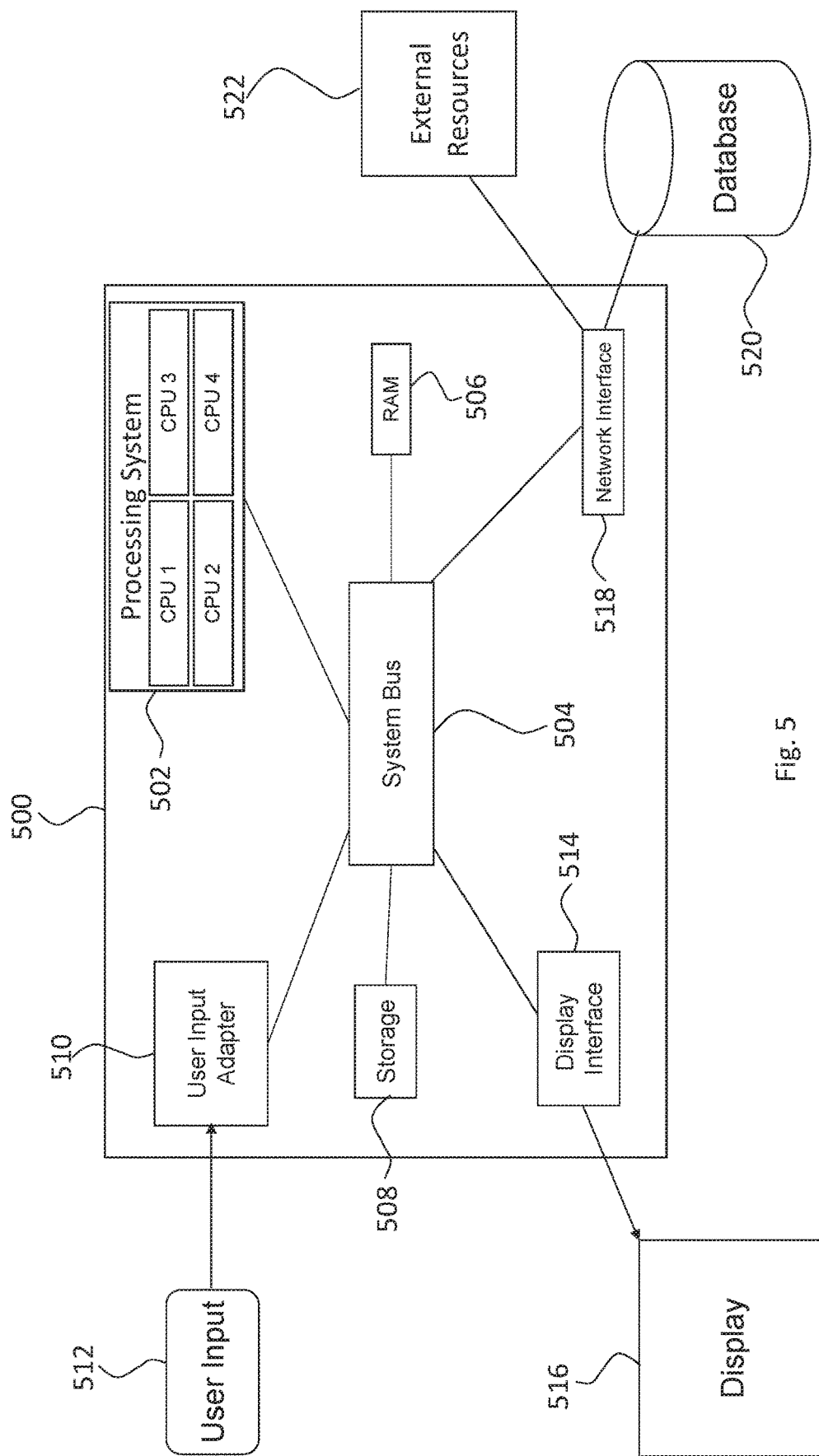
FIG. 5 is an example computer system according to certain example embodiments.
Figure 6:
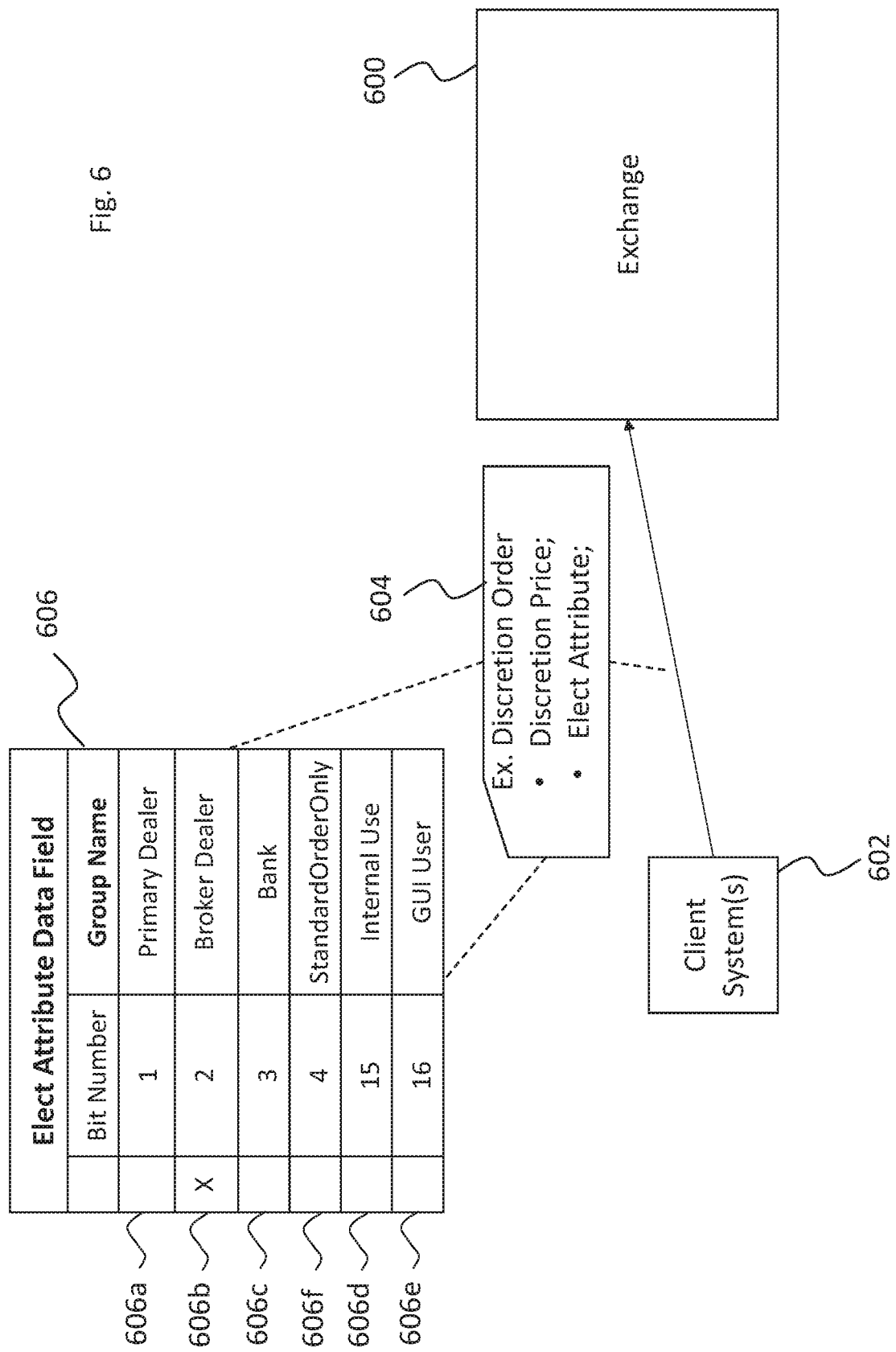
FIG. 6 illustrates a non-limiting example function block diagram of a computer-implemented exchange system that is configured to receive elect orders that have discretion according to certain example embodiments.

FIG. 1 illustrates a non-limiting example function block diagram of a computer-implemented exchange system that implements an example order book according to certain example embodiments. FIG. 2A shows an example of an order book that may be stored in the system of FIG. 1. FIG. 2B shows multiple different example new incoming orders that may be processed against the example order book shown in FIG. 2A. The matching of orders shown in FIGS. 2A and 2B may be implemented according to the process shown in FIG. 3, which may be implemented on the example exchange system of FIG. 1. FIGS. 4A and 4B shows how mid and discretion orders are handled after being matched. FIG. 5 is an example computer system that may be used to implement the features in FIGS. 1-4B and 6-8B. FIG. 6 illustrates a non-limiting example function block diagram of a computer-implemented exchange system that is configured to receive elect orders that have discretion according to certain example embodiments. The example process shown in FIG. 7 may be implemented on the system shown in FIG. 6 (or FIG. 1). FIG. 8A shows an example order book that may be stored in the system of FIG. 7 (or FIG. 1) and FIG. 8B shows multiple different example new incoming orders that may be processed against the example order book shown in FIG. 8A.

FIG. 1

By way of introduction, FIG. 1 shows a non-limiting example function block diagram of an automated exchange computer system 100 ("exchange" 100 hereafter) that implements an example electronic order book 110 and matching engine processor 108 according to certain example embodiments. Automated exchange computer system 100 may be implemented on one or computer computing servers or systems; such as the system shown in FIG. 5.

Matching engine processor 108 can be a combination of hardware (e.g., a hardware processor, such as a central processing unit) and software or just hardware (e.g., a suitably designed application-specific integrated circuit or field programmable gate array). The matching engine processor 108 generally handles incoming orders and attempts to match incoming orders against those orders stored in the electronic order book 110. In certain example embodiments, in addition or alternatively to matching incoming orders, the matching engine processor 108 attempts to match orders that are already stored in the electronic order book 110 (e.g., attempts to match two "resting" or "passive" orders). As explained in greater detail below, market conditions (e.g., the state of the order book for a particular instrument) may change and cause two orders that were previously stored in the order book to match (or cross). In response to such a change, the matching engine processor 108 may identify two orders that can match and trigger the execution of a trade between those two orders.

Electronic order book 110 can be a data structure (e.g., a database, flat file, list, etc. . . . ) that holds multiple entries in electronically accessible memory (e.g., RAM, cache, registers, hard disk drives, etc. . . . ). Typically, an electronic order book has two sides, side X and side Y, which can be bid and offer/ask or buy and sell sides for the same instrument in the same electronic order book. An example of such an order book is shown in FIG. 2A where sides 200 and 210 of an order book for a single instrument are shown.

In certain example embodiments, the instrument identifiers used in the order book can be associated with, for example, bonds (e.g., U.S. treasury notes of various denominations), stocks, or the like. While any type of instrument may be used, the techniques herein may be more generally useful for those instruments that have typically low volatility. In certain examples, a midpoint order may be preferred for benchmark treasuries, where large size is often desired. Benchmark instruments can trade at the same minimum screen tick bid/ask spread for most of the trading day and thus orders that operate between the spread can be useful for providing liquidity. Midpoint orders could be used for many other products, including treasury bills, short shorts, coupon and rolls, and other instruments. Discretion orders may be preferred for coupon rolls and other instruments that typically operate with slightly wider bid/offers spreads than, for example, benchmark treasuries.

In any event, each newly received order for a given instrument identifier that is not matched (or has a leftover quantity after a successful match) is added to one of the two sides depending on the type for that order (e.g., whether it is a buy or a sell). Orders added to electronic order book 110 are stored until they are canceled (e.g., via a client or system command) or matched against other electronic orders.

In certain example embodiments, orders placed into the electronic order book 110 may be marked as inactive and thus skipped during a matching process performed by the matching engine processor 108. An inactive condition for an order may be triggered by the order not meeting certain market conditions. For example, a midpoint order may be marked inactive if the bid/offer spread is greater than a threshold spread (or if the order book is one-sided such that there are only bids or offers in the order book, but not both). For example, referring to FIG. 2A, if the order book for an instrument only contained bids 200, then midpoint order 203 may be marked as inactive (but still valid) or invalid. Alternatively, midpoint order 203 may be marked as inactive (but still valid) or invalid if the displayed ask side for the order book is too far from the displayed bid side (e.g., the spread is too large). Thus, the order book for an instrument shown in FIG. 2A may have a rule that requires the displayed spread to be 2 screen ticks or less (e.g., a bid of 100 and an offer of 102). Any spread that is outside of that range (e.g., the highest bid of 100 and the lowest offer of 103) will automatically invalidate orders that require the threshold spread to be within the defined range.

Returning to FIG. 1, electronic orders 104 can be submitted by client computer systems 102 to exchange 100 for matching and/or entry into electronic order book 110. Client systems can include personal computers, mobile devices, automated computer systems, and the like. Generally, client systems 102 are any computer system programmed to interface with exchange 100 for the purpose of submitting electronic orders 104.

Electronic orders 104 are submitted in the form of electronic data messages that include a data transaction request for a corresponding order (e.g., a data transaction request to match the order to a pending, or future, order). The electronic order may specify a client ID that identifies the client sending the request (e.g., a company, person, etc. . . . ), an instrument ID that identifies a particular instrument (e.g., a ticker symbol or the like), transaction type ID that may identify, for example, whether the request is associated with a sell or buy instruction, an order attribute that specifies whether this a regular order, a discretion order, a midpoint order, or the like, a quantity value that indicates the quantity of the order, a MinOrder value that indicates a minimum order amount that this order can be matched against, and a price value that indicates a particular price for the order subject to the data transaction request. In certain examples, other fields may be defined in the electronic order and/or some may be optional.

For example, a midpoint order may not require a price value as the price is automatically determined as the midpoint price between the listed bid/offer. Instead, a midpoint order may require a minimum and/or maximum price at which the midpoint order may execute (this "limit" parameter may effectively set a range in which the mid order may be matched with other orders). It will be appreciated that a midpoint point may be entirely hidden (private) such that no aspect of the order is responsively broadcast to general third parties when the midpoint order is entered, matched against, or otherwise interacts with an order book.

In other examples (e.g., in the case of a discretion order), the electronic order may also specify the price for the displayed quantity of the order, the quantity to be publically shown, a number of discretion ticks for the hidden portion (a private attribute of the order) of the order (e.g., tick amount that is less than, such as a fraction of, a standard screen tick quantity), the total size of the order (a private attribute of the order), and the amount of the order that is eligible to be matched with discretion (a private attribute of the order). In certain examples, the electronic order may specify a total size value and a publically visible value (e.g., such that the size of the private part of the order is the difference between the total size and the visible value). In certain examples, the electronic order may specify a hidden size value (a private attribute of the order) and a publically visible value (e.g., such that the total size of the order is the sum of the hidden and visible values). In certain examples, an order may specify the amount of the order that may be matched at the price allowed by the discretion. This amount may be less than the total amount of the order. Thus, for example, a discretion order may display 25, have a total quantity of 1000 (e.g., 975 of the 1000 is a private attribute), and have 500 of that 1000 eligible to be traded at 1 discretion tick from the displayed or publically broadcast price. In certain examples, a private attribute includes a number of discretion ticks. Based on this value and the public price of the order, a discretion price can be calculated. For example, order 201 has a public price (value) of 100, with a private attribute of 2 discretion ticks. Accordingly, the maximum private value at which order 201 can trade is 101 (assuming the 0.5 discretion tick increment used in FIG. 2A).

As discussed herein, public refers to information (e.g., price information, size information, trade information, etc. . . . ) that is generally made available to third parties via an electronic data feed. The parties that receive this information are generally not associated with the order and/or trade. This aspect may also be referred to as "displaying" information to such third parties.

Conversely, private (sometimes also referred to as hidden or dark herein) information generally refers to information for which the details are not provided to such third-parties. Instead the information is made available to the parties associated with the trade, order, match, etc. . . . . This also includes the exchange itself, third party regulatory systems, and the like. Thus, for example, an order may have a public price (e.g. that is "displayed" or provided to third parties), a private price (e.g. that is not expressly displayed or provided to third parties), or a combination thereof (e.g., a public price value and a private price value). In certain examples, when a match is determined between a "public" price and a "private" price, such match information is not made public. The "public" information in such a case is transformed into private information. This is discussed in greater detail below in connection with FIG. 3 and the examples of FIGS. 2A and 2B. It will be appreciated that discretion type orders may have private attributes (e.g., private discretion attributes) and midpoint type orders may also have private attributes (e.g., private midpoint attributes). Other order types with private attributes may be similarly used.

Returning to FIG. 1, electronic data messages that include electronic orders are received by network interface device 106 (e.g., a network card). The received messages are parsed and their contents (e.g., the electronic order included therein) passed onto matching engine processor 108. As discussed above, the matching engine processor 108 attempts to match the incoming order against other passive or resting orders already present in electronic order book 110. The matching engine processor 108 (and/or another processor) may employ the technical algorithm shown in FIG. 3, 4A, 4B, or 7.

In certain example embodiments, if no match is found, then the order is added to electronic order book 110 on the side indicated by the transaction type ID (e.g., whether a bid or offer) and the attributes of the electronic order are similarly populated with the parameters from the electronically submitted order. In certain example embodiments, the order is placed into the order book directly and the matching process is then run for the newly updated order book. In certain example embodiments, the matching engine processor 108 runs by attempting to match the incoming order at the displayed price and then runs a further process to determine if any passive orders in the order book cross and/or match.

In any event, if the newly submitted order is added to the order book, an acknowledgement is sent to the order submitting client system 102. If the order is a publically lit order (e.g., a retail order with no private attributes), then the details of that order may be transmitted to third party external computer systems via network interface. The details of the order may be included in a data stream (e.g., a real-time market data feeds) to which customers subscribe (e.g., such as NASDAQ TotalView-ITCH$^{SM}$). Notably, orders that are not public (e.g., "dark" orders or private order details, etc. . . . ), are not included as part of such customer data streams. In certain examples, public portions of an order (e.g., a display price and/or display size) are publically made available, while the private attributes are not. In certain examples, notification of a hidden order may only be sent back to the order submitting client.

If a match is found, then a record of that match may be generated and distributed through network interface 106 or network interface 112. In general, if the match is at a price that is not a displayed price, then the trade details are not included as part of real-time public data feeds. Instead, confirmation of such orders are only provided to the counter-parties for the trade. Thus, for example, if the match is between two orders that are not public (e.g., two mid orders), then a record or acknowledgement is only sent to the two customers involved in the order and is not included in a public data stream. Alternatively, if a match is performed at a publically listed price (e.g., the listed bid/offer price) then a record of the trade may be included in the public data stream. In certain examples, upon identification of a match, the trade between the contra orders is executed and post-processing for the trade may be carried out by external computer exchange systems 114 (e.g., settlement, etc. . . . ).

In general, trade information updates may work as follows: trades that involve orders with the mid attribute will trade in the dark (e.g., customers associated with the trades are the only parties that are immediately notified when the trade occurs). Thus, even if a "regular" order (e.g., not a discretion order or a midpoint order) is matched with a midpoint order, the details of that trade will not be made publically available via real-time data feeds. Similarly, if a discretion order relies upon a private discretion attribute to find a match, then the details of that trade will not be publically available. If, however, a discretion order is matched at its displayed price, then trade details will be made public via example real-time market data feeds. In certain example embodiments, all trades (including those matched using private attributes) may be summarized at the end of a trading day and presented in aggregate or detailed form.

FIGS. 2A-2B

Turning to FIG. 2A, an example order book is shown with bid side 200 and ask side 210. This example order book may be included in electronic order book 110.

Different instruments may have different attributes for how different order types may be handled by the order book. In the example shown in FIG. 2A, the instrument has a screen tick of 1 (e.g., 100, 101, 102, etc. . . . ). These screen ticks represent valid displayed bids or offers that may be entered for any given order. For example, order 201 was entered with a displayed price of 100 (e.g., a public value or a publically visible value). In addition to having a screen tick of 1, the valid discretion tick amount for this instrument is 0.5. Generally, the discretion tick amount will be a fractional amount of the screen tick amount, such as, for example ½, ¼, ⅛, etc. . . . of a screen tick. However other values are also possible.

In certain examples, orders with private attributes (e.g., midpoint orders and/or order that can be executed with discretion) may require the order size of counter-party parties to be greater than or equal to an execution size requirement in order to be eligible to match against the private attributes (e.g., prices or volumes) of the order. For example, orders that are eligible to match against either mid or orders executed with discretion, must have a quantity that is equal to or greater than 100. In certain example embodiments, this minimum block execution size may differ for mid orders and orders executed with discretion (e.g., one may 100 and the other 200). Examples of private attributes include the discretion order quantity, a discretion tick amount, a total order size (e.g., other than the displayed order size), a discretion price, an order size of a midpoint point order, and the like.

Another property for an instrument may be a size requirement that an order must meet to be eligible to make use it's private mid and/or discretion attribute. In the example in FIG. 2A, this size require is 100 and thus only orders that meet or exceed this size threshold can be labeled with the discretion or mid attribute. In certain example embodiments, if an order initially has sufficient size to meet this requirement, but the size of the order is decreased because, for example, a portion has been matched, it may lose the mid and/or discretion attribute. Order 204 is an example order that previously had the discretion attribute. But the attribute was removed because a portion of the total quantity was matched against a contra-side order (which reduced the size to below 100). In certain example embodiments, customers may be notified upon such a change in status and given the opportunity to increase the size of their order to meet the minimum size requirement. In certain examples, orders that are lower than the minimum size requirement are canceled and a notification of such cancellation is sent to the customer.

In certain example embodiments, instruments may also define a maximum bid/offer spread in which discretion and/or midpoint orders are valid. If the spread exceeds this value, then midpoint orders and/or discretion orders will be marked as inactive or canceled. The example shown in FIG. 2A is using a max bid/offer spread of 2 so that if the bid/offer spread exceeds 2 the midpoint orders in the order book will be marked inactive.

Each order in the order book may have one or more parameters. An order can specify a displayed price for that order. Certain orders, such as midpoint point order 203, may not include a price because the price for the midpoint order is dynamically calculated based on current market conditions. In the example shown in FIG. 2A, and assuming the total order book is represented via sides 200 and 210, the dynamically calculated price for order 203 will be 101—the midpoint between the current bid/offer spread of 100/102.

Another parameter is the displayed size. This size value is the size shown (e.g., is public) to other customers (e.g., via a market data feed). Thus, order 201 is displaying a bid of 25 at 100. The displayed size may be different from the "total" size of the order as order 201 has a total size of 500. In such a situation, the displayed size may not change even if an order for 25 at 100 is executed for order 201. Rather, the total size of order 201 may decrease by 25 (e.g., from 500 to 25).

Other parameters relate to orders executed with discretion. Discretion ticks indicates the amount of discretion ticks (in this case 0.5) from the displayed price of the order that a match is allowed to be made. Accordingly, order 201 can execute against contra-side orders for 100.5 and/or 101. As noted above, for a contra order to be eligible to match against an order using discretion (such as order 201), it must meet the minimum block size requirement.

The attribute parameter indicates the type of order that is being executed (e.g., regular if blank, midpoint, discretion, etc. . . . ). Other types of orders may also be included. For example, instead of specifying discretion ticks, an order by indicate a specific price at which it may discretely execute. The order may only execute at that price or may execute at any valid price between the current displayed price and the discrete price.

The timestamp parameter is included to indicate when an order was received and/or otherwise last modified. The timestamp parameter is used when arranging the order book in a price/time manner.

The limit parameter is used to place a floor and/or ceiling for a midpoint order. Thus, for example, order 203 will not exceed a price of 102—even if the actual midpoint of instrument represented by the order book in FIG. 2A moves beyond 102.

Accordingly, for the order book represented in FIG. 2A, the current bid/offer spread is 100/102 or 2 screen ticks and there are 5 orders in the bid side 200 of the order book and 2 orders in the offer side 210 of the order book.

FIG. 2B shows multiple different example new incoming orders that may be executed against the example order book shown in FIG. 2A. Orders 220, 240, and 250 are new offer orders and order 240 is a new bid offer. These are example orders that could be executed according to the processes shown in FIGS. 3, 4A, 4B, and/or 7.

FIG. 3

Figure 3:
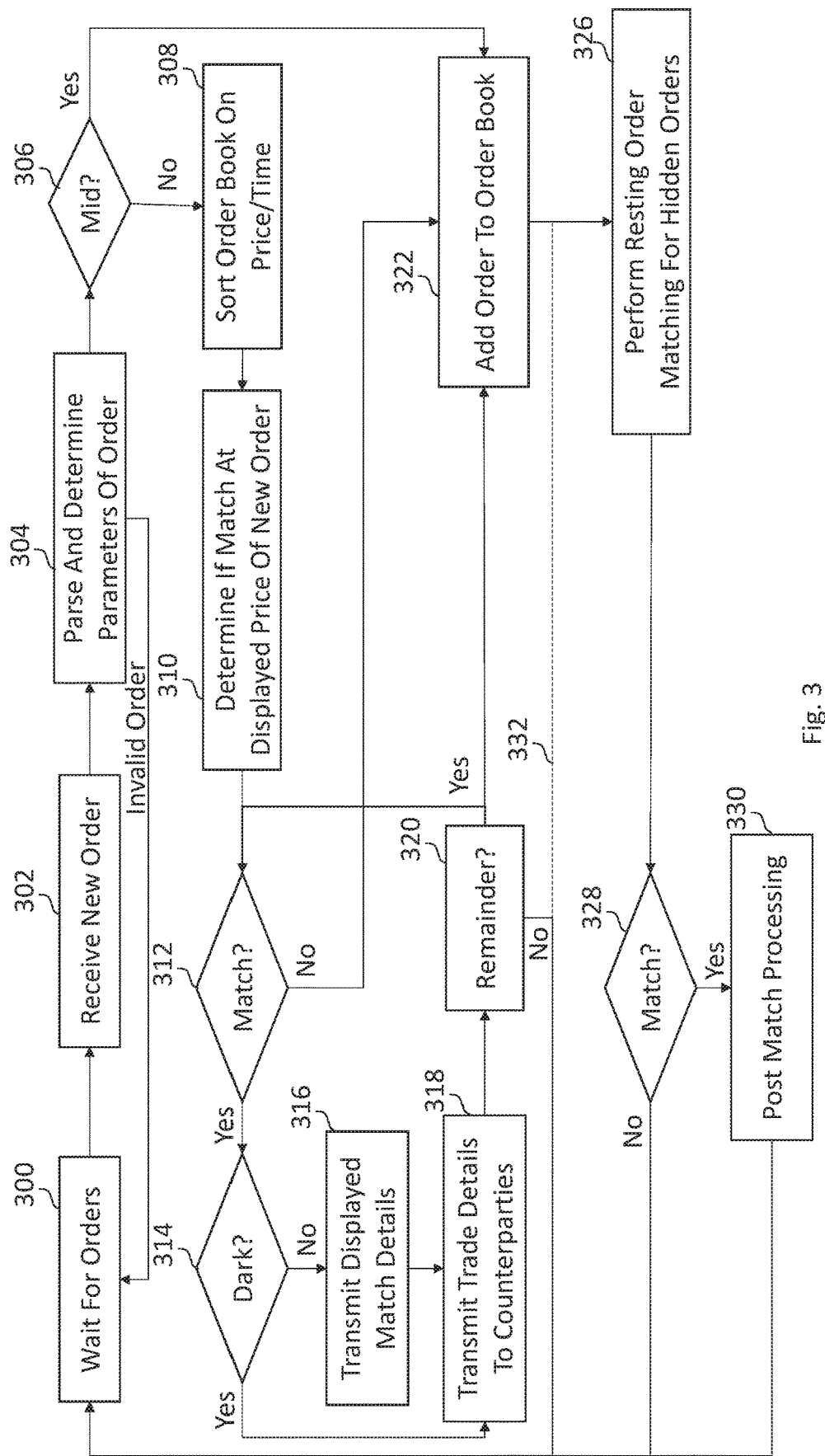
FIG. 3 is a flow chart of an example matching process implemented for incoming orders according to certain example embodiments.

FIG. 3 is a flow chart of an example matching process implemented for incoming orders according to certain example embodiments. The matching process described herein may be implemented as part of matching engine processor 108 and/or the processing system 502 from FIG. 5.

At step 300, the process is waiting for a new incoming order and at step 302 a new order is received (e.g., contained in an electronic data message submitted from a client system to an exchange computer system and via network interface). In response to reception of the new order, the order is parsed to determine its parameters in step 304.

As part of the parsing and determination step, a check is run to determine if the submitted parameters for the new order are valid. For example, if the new order is a midpoint order, but the size of the order is not equal to or greater than the required block size for a midpoint order, then the new order may be invalid and a responsive electronic data message indicating as such may be sent in response to the order submitting client computer system. As another example, if the new order is a midpoint order and the market is not a valid two-sided market (or the bid/offer spread is greater than the midpoint allowable spread), then the order may be valid, but marked as inactive (or another similar property). In certain examples, a valid order may be placed into the order book as an inactive order and may be activated upon adjusted market conditions (e.g., when there is a valid bid/offer spread within the maximum midpoint spread threshold). In this type of example implementation, an electronic data message may be sent to the order submitting client that the market (e.g., the bid/offer spread is too great) for the give instrument was not valid for the order they submitted, but the order was placed into the order book as an inactive order and will be activated when market conditions meet the required conditions.

After verifying the parameters of the incoming order, then the computer system determines if the new order is a midpoint order at step 306. If the new order is a midpoint order, then the process skips to step 322. If the new order is not a midpoint order, then the process proceeds to step 308. The reason why midpoint orders skip steps 308, 310, etc. . . . is that midpoint orders may not be processed as an aggressing order because they are placed at the dynamically determined midpoint price of the market. Instead, they are added to the order book at step 322 and then all of the resting orders in the order book are processed to determine if there are any matches or crosses.

Assuming the new order being processed is order 220 from FIG. 2B, with the current state of the electronic order book represented by 200 and 210 in FIG. 2A, the process determines that order 220 is not a midpoint order and proceeds to step 308 where the current order book is sorted on a price/time basis.

While the preferred embodiment sorts the other book on a price/time basis, other types of sorting may be implemented according to certain example embodiments. For example, the order book may be sorted based on, or take into account, the size of the order. It will be appreciated that sorting of the order book may occur at different points in the process and/or the order book may be maintained in a price/time order (e.g., such that new orders are properly inserted into the order book on a price/time basis).

In certain example embodiments (e.g., referring to the sorted order book shown in FIG. 2A), sorting on a price/time basis includes sorting based on the private or "hidden" price associated with the orders. In this case, midpoint order 203 is not visible (public) but is sorted (e.g., logically) to the "top" of the order book because the dynamic price of order 203 (i.e., 101) is the highest price bid price for the instrument and its timestamp is older than order 201.

Order 201 has a displayed price of 100 and a timestamp of 8, but is sorted just after order 203 on a price/time basis within the order book because order 201 has 2 possible discretion ticks and accordingly can match offers of 101. In other words, the orders in the order book are sorted on a price/time basis by taking into account the discretion price (e.g., the private attribute) that discretion orders may (but are not required) to trade at.

In certain example embodiments, when an order has its private attribute removed, it may be resorted or placed at a different priority within the order book. For example, consider that order 204 previously had a total size of 300 and 2 discretion ticks and a new offer came in at 101. Because order 204 has a timestamp of 3 it would have has priority over orders 203 and 201 at the 101 price and it would have matched against the incoming 250 offer order. However, after matching with the 250 offer order the total size of order 204 would be less than the 100 order size threshold that is allowed for discretion orders. Thus, the private attribute would be removed and the resulting order would be sorted behind the other orders that are operating at a hidden price.

In certain example embodiments, the order book is sorted based on the total (or the displayed) size of the incoming order. For example, if the incoming order is 230 shown in FIG. 2B, the order book may be sorted without taking into account the hidden price (e.g., the private value) of the midpoint and/or discretion orders. This is because order 230 does not meet the block size requirement to be eligible for matching against contra-side hidden orders. Instead, order 230 only matches at the displayed price and accordingly the order book may be sorted using price/time basis that only uses the displayed price of the resting orders. Thus, in this example, order 202 will be the first or top order in the order book followed by order 204. Conversely, if order 220 is the incoming order, then the order book may be sorted taking into account the hidden price of the orders.

In any event, at step 308 the order book is sorted and at step 310 a matching process is performed using the price/time sorted order book. During this matching process all new orders are treated as regular orders at which a match is attempted using the displayed price of the new order. Alternatively, if the new order is an order that can execute with discretion, the new order can attempt a match at its discretion price(s).

At step 312 if a match is found, then the process determines if the match is at a private price (also referred to as a price that is hidden or dark) at step 314, if the match is at such a price then the process only transmits the details of the resulting trade at step 318. If the match was not at a private price (e.g., private for either order), then the details of the trade are published to market-data feeds that can be subscribed to or otherwise viewed by third parties.

After transmitting the details of the matched trade, then at step 320 the process determines if there is any remaining quantity for the matched orders. In certain example embodiments, even if there is remaining quantity the remainder may be canceled (e.g., if the remaining quantity is below the block size threshold) and the process returns to waiting for additional orders are step 300. In certain example embodiments, as described below, the process may still execute resting order processing as set forth in steps 326, 328, and 330 by taking branch 332. In certain examples, after finding a first match, the remaining size of the new order may be used by the matching engine processor to determine if another match at step 312 can be identified.

Alternatively in step 320, if there is a remainder quantity to the new order (e.g., that has not been matched) or if there was no match for the new order in step 312, then that order and its remaining quantity are added to the order book at step 322. As noted above, if the process determined the new order was a midpoint order, then it is added to the order book at step 322 at the dynamically determined midpoint price for the instrument.

As discussed above, the new order may be added to the order book on a price/time basis. Thus, for example, order 220 may be added at the top of the order book because its possible discretion price is lower than order 212. Alternatively, it may be added as the last order in the order book because its displayed price is equal to the displayed prices of the existing orders and its timestamp (9) is newer than the existing orders.

After adding the new order to the order book at step 322, the process then performs a matching process across the order book to determine if any matches can be formed. This process uses the private discretion attributes of all of the orders when attempting to form a match. Thus, for example, a new order would not be executed with its discretion ticks in step 310 (although, as discussed below, resting orders may be matched based on their discretion attribute in step 310), but rather the discretion ticks for the new order would be used when performing the matching process in step 326.

After performing the matching process in step 326, then if there is a match in step 328, then the process handles post match processing based on the order types involved in the match. Specifically, midpoint orders may have post match processing as described in FIG. 4A and discretion orders may have post match processing described in connection with FIG. 4B.

If no match is found in step 328, then the process returns to step 300 to wait for newly submitted orders.

The following discussion illustrates how the example incoming orders in FIG. 2B may be executed according to the process shown in FIG. 3. Orders 220, 230, 240, and 250 are all assumed to be new orders with a resting order book as shown in FIG. 2A.

If the new order is order 220 (a discretion order), then step 310 will determine if a match can be accomplished using the displayed price of order 220 against the displayed or hidden (e.g., discretion or midpoint) price of resting orders 200 in FIG. 2A. Thus, with a displayed offer of 102, there is no bid that can match with order 220 and accordingly the result of step 312 is that no match is found (either using discretion of the resting orders or not) and order 220 is added to the order book (side 210) in step 322.

After adding order 220 to the order book in step 322, the process attempts to find matches from the resting orders in the newly updated order book. This process will use the hidden prices of both sides of the order for determining if a match is possible.

Accordingly, order 220, using 2 of its 3 permitted discretion ticks, will match against midpoint order 203 at a price of 101 for a size of 400. This will decrease the size of order 220 and fulfill order 203.

Step 326 continues performing the matching process and identifies another match between order 220, with 3 permitted discretion ticks, and order 201, with 2 permitted discretion ticks. Here, there are two possible prices at which order 201 and order 220 may match, 100.5 (using 3 ticks from order 220 and 1 tick from order 201) and 101 (using 2 ticks from each order). In certain example embodiments, the price is set at the full discretion price of the aggressing (or newer order) and may thus be set at 100.5. In other examples, a price for a trade of crossing discretion orders may be determined such that each order gives up a discretion tick if the aggressing order has crossed the resting order by 2 ticks. If there is a three tick (or one tick) difference between the discretion prices of the crossing orders then the aggressing order would give up the extra tick and the resting order give up 1 tick (or none in the case of a 1 discretion tick difference). In other example embodiments, the price may be set at 101.

In certain example embodiments, the price of the match is determined to favor the older of the two orders being matched, such that when there is a choice between which order will use a discretion tick to achieve a match, the newer order will use its tick. Thus, in this example, order 201 is the older of the two orders and accordingly order 220 will be treated as the aggressive order and "use" its discretion tick to achieve a match at 100.5. In other words, when the discretion prices of two orders cross, the resulting trade price will be the discretion price of the incoming order (in the above example the incoming order is the newer of the two orders and is the crossing order), not the discretion price of the resting order (order 201). Other techniques for determining the price at which the match is accomplished may be used.

Accordingly, two matches have been found between order 220 and 203 and order 220 and 201. After finding these two matches, step 326 continues determining if further matches can be found and identifies a match between order 202 and order 220 at a price of 100.5. Accordingly, order 220 will match first against order 203, then against order 201, and finally against order 202.

For each of the three matches, step 328 is executed and step 330, post-match processing is similarly executed for each of the matches. The post-match processing for midpoint orders is described in connection with FIG. 4A and the post-match processing for discretion orders is described in connection with FIG. 4B. For example, order 220 has been matched for 1400 quantity and thus has a remainder of 100. This size satisfies the minimum discretion requirement and thus order 220 is kept in the order book on side 210 with a displayed price of 102, a display size of 75, and a total size of 100, with 3 discretion ticks. Orders 201, 201, and 202 are handled according to the respective processes shown in FIGS. 4A and 4B (depending on the order type).

As all of these matches were at hidden or dark prices and accordingly the details of the trades are not pushed to market-data feeds. Instead, only the counter-parties to the respective trades will be notified. Thus, the customer that submitted order 220 will know details of each of the three trades and the customers associated with orders 203, 201, and 202 will only know the details of their specific trades, but not the other trades (e.g., the customer for order 201 will know be notified of the trade concerning order 203).

Turning to another example where order 230 is a new order for the instrument with the order book shown in FIG. 2A (note that this example is independent of the results of the above discussed example of order 220). As noted above, in step 308, the order book may be sorted based on the order type of the incoming order. In this case, the order is a regular order and does not satisfy the minimum block size requirement in order to be eligible to match at a discretion or midpoint price. In such a case, the order book may be matched only using the public price and the timestamp (e.g., in FIG. 2A order 202 would be at the top of the order book).

Here, order 230 is an offer of 75 at 100 and is a regular order without a midpoint or discretion attribute. In step 310, the executing process determines if there is a match to be made at the Price (100) of order 230. The order(s) that order 230 matches against may depend on how the order book is sorted in step 308. If the order book is sorted based on the displayed price, order 230 will match first against order 202 (with a timestamp of 1). Alternatively, if the order book is sorted to factor in the hidden discretion price of the orders, then order 230 may match against order 201.

The matching process may also depend on whether the new order is matched against the displayed size of the resting orders or is matched against the total (or reserve) size of the resting orders. For example, order 202 displays a size of 50, but has 500 total size. Thus, order 230 may be matched against order 203 for the full 75. This may result in decreasing the total size of order 202 by 75, but keeping the displayed size at 50. Alternatively, order 230 may match using only the displayed size of the resting orders. In such an example (assuming the order book is sorted based on the displayed price), order 230 will match for 50 against order 202, then 10 against order 204, and 15 against order 205. In certain instances, orders that match with their displayed size may be re-clipped with some of their reserve. In certain example embodiments, an order that fulfills its displayed size will be automatically canceled—even if there is size remaining in reserve for that order.

In any event, as can be seen, offer order 230 will be fulfilled at a price of 100. As the prices for each of these orders is at a public price, the details of the one or more trades will be made available through a market data feed. As there is no remainder, then the process proceeds back to step 300. The process may also take optional branch 332 and perform a matching process for the resting orders (discussed in more detail below).

In certain examples, the matching process for discretion orders may operate according to an example modification to order 230 with a displayed/total size of 500. In this example, the matching process will find matches with order 203 and 201 at a price of 101 because the new order meets the minimum discretion and midpoint size requirements. Thus, if a new order crosses the discretion price of a resting order (assuming an existing valid two-sided market), the resting order may give up its full discretion amount. Alternatively, in other example matching engine processes, the order may execute at the displayed price of the incoming order. In certain example embodiments, the matched price may be one-discretion tick off the full discretion price of the passive order.

In the next example, bid order 240 of 101 for 1000 is received as a new order. This is a regular order without discretion and proceeds to step 310 where the process attempts to match order 240 against the resting orders in the order book. However, there are no possible matches to be found with a bid of 101. Accordingly, order 240 is added to the order book at step 322.

As a result of adding order 240 to the order book, the displayed spread of the instrument is adjusted. Previously the bid/offer spread was 100/102. With the addition of order 240 to the order book, the bid/offer spread is now 101/102. As the spread has changed, the midpoint of the market has also changed. In response to detecting a change in the calculated spread of the instrument, the midpoint price of any midpoint orders will be adjusted. In this example, the midpoint price of order 203 will be dynamically adjusted from 101 to 101.5—the new midpoint of the market. Thus, when new orders are added to the order book in step 322, the order book is re-sorted, which may involve recalculating the midpoint price of any midpoint orders.

The process proceeds to step 326 to determine if there are any matches to be made from the newly updated order book. In this example with order 240, the addition of this order has caused the midpoint price of order 203 to be 101.5, which is within the discretion range of order 212. Thus, the addition of order 240 ends up causing a match between order 203 and order 212 at 101.5 for 400. This resulting trade is a hidden or dark trade and is therefore not made available to third party market-data feeds.

As a modification to the above example, consider if order 203 has a limit price of 101. This parameter would mean that order 203 would not be dynamically re-priced to 101.5 as it exceeds the stated limit price. Instead, order 203 may be marked as inactive, canceled, and/or a notification may be sent to the customer regarding the new midpoint price of the market and the invalid nature of midpoint order 203 (assuming a limit price of 101).

In certain example embodiments, if a customer updates the limit price of a midpoint order (or other type of order), then the timestamp of the order is also updated to be the timestamp of when the limit was updated as opposed to when the order was initially submitted. This feature may prevent customers from always being "first" for midpoint orders while at the same time shielding themselves from changes in the market. Similarly, an adjustment in the discretion tick or price amount may cause the system to update the timestamp associated with the corresponding order. For example, a customer may want to update the discretion tick amount of order 201 as a result of the market moving because of new order 240. If the discretion tick amount is updated to 3 for order 201 (which would result in a match with order 212), then the timestamp for order 201 will also be updated to be the current time stamp of the system. Other types of interactions with order parameters (e.g., price) that are currently resting in the order book may cause the timestamp for the order to be updated.

In certain example embodiments, if a customer updates the displayed size and/or total size of a resting discretion or midpoint order, then the timestamp will not be updated for that order. In other example embodiments, the time stamp for the order may be updated.

The decision of whether timestamps are updated for modifying certain parameters of an order may be based on the type of instruments or security being updated.

Returning to the examples in FIG. 2B, order 250 is a midpoint order and accordingly the branch at step 306 will cause the processing to skip steps 308, 310, etc. . . . and proceed directly to step 322 where order 250 is added to the order book as resting order. The current midpoint of the instrument is 101 and the process proceeds to step 326 where the matching engine determines if there are any matches to be made from the resting orders. In this case, order 250 will match against order 203 at 101 for 400 and match against order 201 at 101 for 500 (using the two discretion ticks of order 201). Order 250 will be left with a size of 100 (which satisfies the minimum midpoint block requirement) and left in the order book as a midpoint order on the offer side. As there are two matches, post processing will be performed for both trades at step 330 for the orders involved in the trade.

Order 260 is another example that is like order 220, but with a price of 101 and a discretion tick of 1. In this example, order 260 is matched using the displayed price of 101, in step 312, with order 203 at 101 and order 201 are 101. These trades are processed in the dark at step 314. The remaining quantity, 600, is added to the order book, and the matching process in step 326 is performed. In this matching process, the remaining quantity of the order 260 is matched with order 202 for 500 at 100.5. This is also a trade that occurs in the dark.

In certain example embodiments, an alternative matching process may be used. Specifically, rather than using the displayed price of an order when matching in 310, the aggressing order is processed based on its full discretion price. With such a process, order 260 would be matched at 101 for 400 and then also matched at 100.5 for 500 twice, once for order 201 and once for order 202. The remaining 100 would be added to the order book in step 322, with no further matches being found in step 326. Thus, it will be appreciated that the embodiments herein contemplate different possible matching techniques for the orders based on, for example, the particular needs of an application, instrument, or situation.

In certain example embodiments, the displayed price of a contra-side may act as a limiter on how far a discretion order may "reach." In other words, even if a possible discretion price is beyond the displayed price, the system will still use the displayed price for a match rather than the full discretion price of an aggressing order.

In certain example embodiments, post-processing (e.g., as discussed in connection with FIGS. 4A and 4B) occurs upon finding a valid match and may thus occur subsequent to step 310/312 and/or step 326/328. In certain examples, these processes occur subsequent to each match, thus if multiple matches are found for an order (e.g., order 220), the processing may occur each time a trade is identified.

FIG. 4A

FIG. 4A is a flow chart showing example post-processing for orders that are matched and have the midpoint attribute.

In step 400, a valid match that involves a midpoint order is found. When a midpoint order is matched against another midpoint order, a discretion order, or a regular order, the details of that order are not made publically available via a market-data feed or the like (e.g., all of the midpoint order is private). Accordingly, in step 402, the details of the trade that involves the midpoint order are only sent to the counterparties for the trade.

In step 403, if there is no remainder for the midpoint order that was matched, then the process returns at step 410. If there is additional quantity left over after execution of the trade, then the process moves to step 404 where it is determined if the remaining unmatched quantity of the order is greater than or equal to a size limit for midpoint orders.

In step 406, if the remaining quantity is not greater than the size limit, the order is canceled. And the process returns at step 410. In certain example embodiments, a customer associated with the midpoint order may be given the opportunity to increase the size of the order to at least meet the minimum size requirement.

In step 408, if the remaining quantity of the midpoint order is greater than or equal to the size limit, then the midpoint order remains in the order book with its remaining quantity. The process proceeds to step 410 and returns (e.g., to the processing in FIG. 3).

FIG. 4B

FIG. 4B is a flow chart showing example post-processing for orders that are matched and have the discretion attribute. In step 450, a valid match that involves a discretion order is found. If the match is with another order at a price that is private, then the trade occurs in the dark and the details of the trade are only transmitted to the counterparties in step 454. For example, if a resting discretion order and an aggressive regular order match at a price between the bid offer/spread (assuming the regular order satisfies the block size requirement to match against discretion orders), the details of that trade will not be made publically available through a standard third part market-data feed. If, however, the aggressive regular order matches at the displayed price of the resting discretion order (e.g., it does not satisfy the discretion size requirements), then the trade details of that order will be transmitted via public market data feeds in step 452 and the trade details of the executed trade will also be transmitted to the counter-parties.

In step 455, the process adjusts the total quantity for the discretion order based on the matched quantity in the executing trade. For example, when order 220 is matched with order 203, the total quantity of order 220 is decreased from 1500 to 1100.

In step 456, the process determines if there is remaining quantity for the discretion order, if there is no remaining quantity (e.g., the order has been fulfilled), the process returns at step 458.

If there is remaining quantity, the process moves to step 460 to determine if the remaining quantity is greater than (or equal to) the size requirement for discretion orders. Referring back to the example of FIG. 2A, the size requirement for an order to use discretion would be 100.

If the remaining quantity is less than the size requirement, then the discretion attribute of the discretion order is removed in step 462 and the order become a regular order with (potentially) a hidden size. For example, order 204 may have previously been a discretion order until the total size of the order dropped below 100. After adjusting the discretion attribute, the process returns in step 472. Conversely, if the size limit is meet in step 460, then the process returns at step 472.

In certain example embodiments, an order book may not have a two-sided market (e.g., there are only bids or only offers in the order book). For example, the order book for an instrument may only include bid side orders 200 as shown in FIG. 2A (without any offer side orders). In such a situations, midpoint orders are marked as inactive. Further, resting discretion orders that are subsequently crossed by aggressing counter-party order will only execute with 1 tick of discretion away from the maximum discretion price of the aggressive order. Accordingly, if an order is displayed at price A and has 3 ticks of discretion and an aggressing (or newer) order, which meets the minimum discretion size requirement, is placed at the price of A, then the match will occur at 1 discretion tick from the price of A. As this trade occurs at a hidden price, the trade is executed in the dark.

This technical matching implementation may have the following benefits. First, it protects the passive trader that has multiple ticks of discretion on the resting order. The trader is thus not giving up significantly more value than what the aggressing party was willing to trade at. Second, it rewards the aggressor with the one tick of discretion (e.g., a better price than that at which they submitted the order) and removes the need to search for discretion, prior to submitting an aggressive order. Third, while the aggressing order may leave a little bit of price difference on the table, and the resting order may pay up more than just the displayed price, on balance for both sides have found liquidity at a fair price. The above one-sided market example may be an additional modification to the order matching process discussed in connection with FIG. 3 (e.g., elements 310 and 312).

In certain example embodiments, customers (e.g., based on the client ID in element 104) can only submit orders, per side of an order book, that are orders with discretion or midpoint orders, but not both at the same time. In certain example embodiments, clients may submit both order types.

As described above, using midpoint or discretion orders restricts which contra-orders can be a valid match based on the size of the contra-orders. Alternatively, or in addition to these restrictions, other restrictions may be placed on orders. For example, an order that is executed with discretion may be restricted to certain types of customers associated with a counter-party order. Such an implementation could provide customized liquidity to certain customers (or types of customers). Thus, a market maker could restrict discretion orders (or a part of a discretion order) to client of the market marker. A client can thus customize how its liquidity can be used. In another example, primary dealers could sponsor their own clients and offer them liquidity that trades with discretion and/or at a midpoint. Other types of targeting for orders may also be implemented based on the properties of the counterparty order (or client that is submitting the counterparty order).

In certain example embodiments, while real-time market data of trades that are executed in the dark are not made available to the public, such information may be controllably released in the form of a total volume for a particular instrument at a configurable time interval—e.g., hourly, every 3 hours, end of day, etc. . . . .

In certain example embodiments, the inclusion of different order types into a single order book can create a more unified handling of orders (e.g., a better liquidity pool) for a given instrument identifier and may make it easier for customers to act between the bid/offer spread (e.g., at wholesale prices). These techniques may be advantageous for instrument identifiers that have low volatility and may not have the bid/offer spread for the instrument move during a trading day (e.g., U.S. treasuries).

FIG. 5

FIG. 5 is a block diagram of an exemplary computing system 500 (which may also be referred to, for example, as a "computing device" or a "computer system") according to certain example embodiments (e.g., an exchange computing system as described in FIG. 1, a user device as shown in FIG. 1, etc. . . . ). Computing system 500 includes a processing system 502 with CPU 1, CPU 2, CPU 3, CPU 4, a system bus 504 that communicates with RAM 506, and storage 508. The storage 508 can be magnetic, flash based (e.g., for a mobile client device), solid state, or other storage technology. A storage system may comprise cache memory that are on the computer chip of CPU 1, RAM 506, storage 508, hardware registers, external systems 522, and the like.

The system bus 504 communicates with user input adapter 510 (e.g., PS/2, USB interface, or the like) that allows users in input commands to computing system 500 via a user input device 512 (e.g., a keyboard, mouse, touch panel, or the like). The results of the processing may be displayed to a user on a display 516 (e.g., an LCD) via display interface 514 (e.g., a video card or the like).

The computing system 500 may also include a network interface 518 (e.g., a transceiver) to facilitate wired (e.g., Ethernet—802.3x) and/or wireless communication (WiFi/802.11x protocols, cellular technology, and the like) with external systems 522, databases 520, and other systems via network 524. Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

External systems 522 may include other processing systems, systems that provide third party services, computing nodes such as miners for the blockchain, etc. External systems 522 may be client devices or server systems.

External systems 522 may also include network attached storage (NAS) to hold large amounts of data. External systems, along with the internal storage and memory, may form a storage system for storing and maintaining information (e.g., order book information, routing strategies, etc. . . . ). Such a system may communicate with users and/or other computing systems that process electronic order data messages. The database 520 may include relational, object orientated, or other types of databases for storing information (e.g., order book information for a financial instrument, trade information between two participants, etc. . . . ).

In other words, the processes, techniques, and the like, described herein (for client devices, server, exchange, and/or controller systems) may be implemented on a computing system. Such implementations may then configure or program the processing system to carry out aspects according to certain example embodiments. It will be appreciated that other architecture types may be used. For example, a single CPU may be used instead of multiple CPUS. Alternatively, a processing system may include multiple CPU "cores." Further, the various elements shown in connection with FIG. 5 may be included into one cohesive physical structure (e.g., such as a tablet device). The components and functionality shown in FIGS. 1-4B and 6-8B may be implemented on or in conjunction with the example computing system shown in FIG. 5 (e.g., to thereby create a specific purpose computing machine).

The computing system may be arranged, in various embodiments, in many different ways. As just one example, the computing system may be arranged such that processors include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip or a "system-on-chip"). As another example, the computing system may be arranged such that: the processors include two, three, four, five, or more multi-core processors; the network interface devices include a first network interface device that implements Ethernet and a second network interface device that implements WiFi and/or Bluetooth; and the memory devices include a RAM and a flash memory or hard disk.

As described herein when a software module or software process performs any action, the action is in actuality performed by underlying hardware elements according to the instructions that comprise the software module. In various embodiments, each or any combination of the matching engine processor 108, order book 110, client system(s) 102, exchange 100, external electronic exchange systems 114, exchange 600, client system(s) 602, etc . . . , each of which will be referred to individually for clarity as a "component" for the remainder of this paragraph, are implemented using an example of the computing system 500 of FIG. 5. In such embodiments, the following applies for each component: (a) the elements of the 500 computing system 500 shown in FIG. 5 (i.e., the one or more processors 502, one or more memory devices 506 or 508, one or more network interface devices 518, one or more display interfaces 514, and one or more user input adapters 510), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices (RAM) 506 and/or (Storage) 508 (e.g., in various embodiments, in a volatile memory device such as a RAM, in an instruction register, and/or in a non-volatile memory device such as a flash memory or hard disk) and all actions described herein as performed by the software modules are performed by the processors 502 in conjunction with, as appropriate, the other elements in and/or connected to the computing system 500 (i.e., the network interface devices 518, display interfaces 514, user input adapters 510, and/or display device 516); (c) alternatively or additionally, to the extent it is described herein that the component processes and/or otherwise handles data, in some embodiments, such data is stored in the memory devices (e.g., in some embodiments, in a volatile memory device such as a RAM and/or in a non-volatile memory device such as a flash memory or hard disk) and/or is processed/handled by the processors 502 in conjunction, as appropriate, the other elements in and/or connected to the computing system 500 (e.g., the network interface devices 518, display interfaces 508, user input adapters 510, and/or display device 516); (d) alternatively or additionally, in some embodiments, memory devices store instructions that, when executed by the processors 502, cause the processors 502 to perform, in conjunction with, as appropriate, the other elements in and/or connected to the computing system 500, each or any combination of actions described herein as performed by the component and/or by any software modules described herein as included within the component.

Elected Discretion

In certain examples embodiments, a central limit order book (CLOB) electronically (e.g., electronic order book 110) maintained (e.g., on a price/time basis or other sorting basis) by an exchange (by exchange 100 or 600) includes a "dark pool" or hidden orders (e.g., orders that are entirely private or have private attributes). The exchange streams market (e.g., order) information (e.g., 500 shares of X is offered at 100) to market participants who can then act on the displayed information. The stream information is valid until it is fulfilled (e.g., a trade is executed) or the order is canceled. In certain examples, the streamed information is anonymous so that the parties to an executed trade will not expressly know the identity of their counter-party. The streaming techniques of a CLOB are in contrast to so-called quote-based order techniques where market participants ask for a quote for a given instrument (e.g., I would like a quote for 500 shares of X).

In certain instances, market participants (sometimes referred to as clients) can "elect" who (e.g., a category or group of other market participant or client types) can execute against the private attributes of their orders. Private attributes include orders that are traded at a midpoint price (a private attribute) and/or orders that can execute at a discretion price (another type of private attribute). Private attributes may also include orders that have a private "reserve" size associated with the order (e.g., "elect reserve" as discussed below). By using the elect attribute for an order, a market participant can know which participant type their private order (or private attribute of a regular order) has executed against, while not knowing the exact identity of the counter party (and vice versa). In a CLOB implementation, private orders (e.g., a midpoint order) or the private attributes of regular orders (e.g., an order that can execute with discretion at another price level) are not included in any public market data feed that is streamed to the public. Instead, this information is kept by the exchange and his "hidden" or kept private from the general public (e.g., market participants). As explained herein, there may be different factors or rules that determine when a hidden order can execute against another order.

In certain example embodiments, the ability for order submitting clients to use the elect functionality is controlled on an instrument by instrument basis. For example, an electronic exchange computing system that trades various types of bonds may only offer this functionality for certain U.S. treasury benchmark bonds.

FIG. 6

FIG. 6 illustrates a non-limiting example function block diagram of a computer-implemented exchange system 600 configured to receive orders with private order properties that have an elect attribute according to certain example embodiments. Client system 602 is configured to communicate with exchange 600 (e.g., which may be exchange 100 as shown and described herein) over electronic communication links to submit electronic messages that include electronic data requests. An example electronic data request is the submission of a new order as indicated in FIG. 6. It should be noted that exchange 600 may be a modified version of exchange 100 (e.g., programmed process the functionality described in FIGS. 6-8B).

Order 604 is an example of an order that can execute with discretion (e.g., as described above) and includes data values that indicate various properties of the order including the price, the discretion price (or number of discretion ticks), size, instrument identifier (e.g., a ticker), and the like. Order 604 also includes an elect attribute data field indicates which type of market participant order 604 can be matched against (for the private part of the order).

The data field for the elect attribute 606 can be a bit mask (e.g., of 16 bits, 32 bits, or other size) where each bit that is turned "on" indicates a different eligible client group. As shown in FIG. 6, bit 1 606a is for "primary dealers," bit 2 606b is for "broker dealers," bit 3 606c is for "banks," bit 4 606f is for standard orders only (which is applied to legal entities that are not eligible for matching based on the hidden attributes of a contra-side order), bit 15 606*d* is for "internal use," and bit 16 606*e* is for "GUI user."

For order 604, the second bit for broker dealer 606*b* is specified indicating that order 604 will allow the hidden attributes of its order to trade against other orders that are from market participants included in the "broker dealer" group. However, if a new order does not specify anything for the elect attribute data field 606 (or indicates that no groups are eligible), then the exchange may attempt to match the new order using its hidden attributes against any contra size order (e.g., as long as other requirements are satisfied, such as price and size requirements).

In certain example embodiments, market participant groups are created and managed by the operator of the exchange. A market participant that interacts with the exchange may be placed into one or more of the groups that have been defined by the exchange. For example, a client may be both a bank and a primary dealer.

In certain example embodiments, there are two different types of market participant groups. The first type classifies market participants according to their legal entity status (e.g., as understood by the exchange, the market participant themselves, or certain regulatory authorities). This includes primary dealers, broker dealers, banks, and the like. Legal entities can belong to multiple groups and entities that are not placed into at least one group may not be eligible for trading using the elect attribute.

Another type of market participant group works outside of the above legal entity types. These include "internal" and "GUI user" types. The internal type provides eligibility to users that belong to the same legal entity. In other words, if a market participant specifies its order is "internal" then it would only be authorized to trade against other orders that are submitted from that same market participant.

The GUI user type indicates the order is eligible to trade against orders that have been submitted using a customer client side application that interfaces with the exchange computer system. An example application may be the eSpeed Trading Application available from Nasdaq that provides users with a graphical user interface for submitting and reviewing trades to an exchange. In certain example embodiments, orders submitted through such an application are automatically identified as such in addition to identification of the client group the userID associated with the order belongs to. In certain example embodiments, orders submitted from such an application may be recognized and eligible to trade against other orders submitted form the application. It will be appreciated that other application types or applications may be added to the bit mask. It will also be appreciated that other techniques for indicating eligible group IDs may be implemented according to certain example embodiments. For example, a delimited list of identifiers may be submitted as part of the order ID to indicate which group IDs are eligible.

In certain example embodiments, both the first "type" and the second "type" of elect preference may be indicated in the same order. For example, a new order may indicate both 606*d* and 606*b*. In such an example, the order would be eligible to execute against any order submitted by that market participant or any other market participant that was classified as a broker dealer.

In certain example embodiments, additional market participant groups may be defined and/or created by the operator of the exchange. In certain example embodiments, the user IDs (e.g., individual logins) associated with a market participant are assigned to the market participant group associated with that specific market participant. In certain example embodiments, individual user ids may be associated with other specific market participant groups (e.g., thus overriding or supplementing the default association).

In certain example embodiments, the elect attribute is only applied to resting orders. As described herein, when a new order with discretion is received, a matching process (e.g., steps 310 and 312 in FIG. 3) is executed to find a match without using the discretion property of the new order (although the discretion attribute of the orders that are resting in the CLOB may be used). If no match is found during this first matching process, the order is added to the CLOB, and the matching engine processor may run a second matching process for the resting orders (that now includes the newly added order).

FIGS. 7-8B

Figure 7:
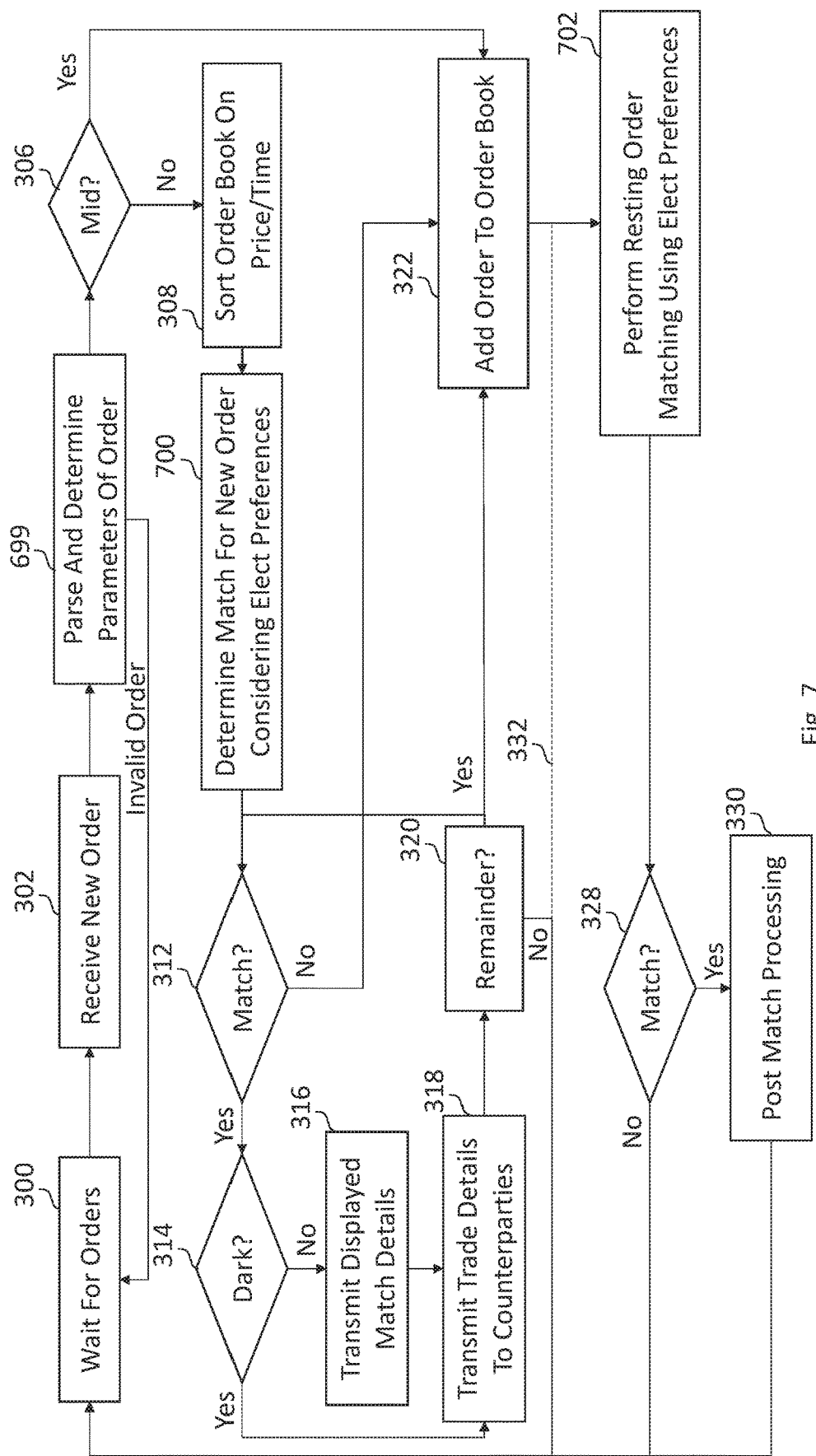
FIG. 7 is a flow chart that shares elements with FIG. 3 and shows another example matching process implemented for orders have elect preferences according to certain example embodiments.

FIG. 7 is a flow chart that shares elements with FIG. 3 and shows another example matching process implemented for orders include the elect attribute according to certain example embodiments. Most elements in FIG. 7 work as described above with respect to FIG. 3. The elements that may operate differently for orders that include an elect attribute are in steps 699, 700, and 702. FIG. 8A shows an example order book for an instrument that includes some orders with the elect attribute. FIG. 8B show example incoming orders that may be executed against the order book shown in FIG. 8A.

In step 699, when a new order is received, the client that submitted the order is known to the exchange (e.g., based on an association between the user ID that submitted the order and a client ID). As discussed above, clients (either on a user level or a legal entity or client level) may be associated with different market participant groups. Accordingly, in step 699, the market participant group or groups associated with the new order may be determined and added to the attributes of the new order (e.g., the client "type" of the order may be defined). In certain examples, this information may already be present in the data fields included in the newly submitted order.

In certain example embodiments, the exchange may validate the elect attributes for an order. If an order has improper elect attributes, the exchange may generate an error message and sent a responsive data message indicating the order (e.g., the limit portion of the order) will not be maintained.

In step 700, when a new order is received the matching engine processor attempts to match the new order with contra-side resting orders in the CLOB considering the elect preferences of the orders. During this matching process, the matching engine processor may use hidden attributes (e.g., hidden size and/or price) of the resting orders for fulfilling the new order. However, if a resting order (e.g., midpoint order or an order that can execute with discretion) indicates its hidden attributes are only eligible for certain market participant groups (e.g., by referencing the relevant group participant identifiers) of which the client that submitted the new order is not a member of, then the matching engine processor will not use the hidden attributes of that order for this matching process.

If no match is found, then, in step 702, the matching engine processor may select one order as an "aggressive" order and filter the contra-side of the electronic order book based on the elect attribute for that order. The matching engine processor may then attempt to match the filtered order book using the discretion price of the resting orders. In certain example embodiments, orders included after the filtering may have their elect attributes processed as well. In other words, while order "A," from a client in group "X" may indicate orders in group "Y" are valid through the elect attribute, a contra-side order "B" of group "Y" may indicate that orders in group "X" are not eligible. Thus, even if order B is included in a filtered version of the order book for order A, no match will be found between these two orders at a hidden price or size.

In certain example embodiments, a matching engine processor may have a discretion market zone attribute that controls the maximum depth an order with discretion will be considered by the matching engine processor. This attribute may be from 0 to another number. A value of 0 may indicate that the discretion price will only be considered for those orders that are displaying the best price (e.g., at the top level of the order book). A value of 1 may indicate that orders with displayed prices 1 tick below the current top level may have their discretion prices considered during the matching process. This attribute may be configurable on an instrument-by-instrument basis and/or on a client-by-client basis (e.g., certain client groups may have a value of 0 applied to their orders, while orders from another client group may use a value of 2).

Consider the following examples by referring to FIGS. 8A and 8B, new order 820 in FIG. 8B is submitted by a client of market participant group 2 (indicated by the "client type" data field). This order will be processed against the CLOB of the exchange shown in FIG. 8A, with pending bid orders 800 and pending offer orders 810. New order 820 is an order that can execute with discretion against orders from market participants of group 1 (as indicated by the "elect" data field). In applying this new order to the order book shown in FIG. 8A, the matching engine processor will first (e.g., in step 700 of FIG. 7) attempt to find a match at the displayed price (101) for this new order. In certain example embodiments, as the price of the new order is at the "displayed" price, the elect preferences for the new order are ignored. In other words, the elect attribute is only used to filter when matching based on the discretion or other hidden attributes of the order.

As shown in FIG. 8A, both order 803 (a midpoint order with the midpoint currently at 101) and order 801 (an order that can execute with discretion up to 101) can satisfy the "displayed" asking price of 101 of order 820. However, the matching engine process will skip over (e.g., based on the CLOB being ordered in price/time priority) order 803 because it has an elect attribute of "3" indicating that it will only match against contra-side orders submitted by clients that are in group 3. As order 803 is a midpoint order, it is completely hidden and the elect attribute for that order applies to any execution of that order. Order 820 was submitted by a client from group 2, and therefore fails the group "3" requirement of order 803, and no trade occurs.

In contrast, order 801 indicates that clients from groups 1 or 2 are eligible for its "hidden" attribute. The hidden attribute of order 801 is the discretion price (101) that it may execute at. Accordingly, a match is identified between order 801 and order 820 at a price of 101 for 500. This order executes in the "dark" as the matching engine process uses the discretion attribute of order 801 to complete the order. After executing this trade, the remainder (displayed size of 75 and total size of 1000) of order 820 is placed into the central limit order book on the offer side.

After placing the remainder of order 820 into the CLOB (e.g., in step 322 of FIG. 7), another matching process in step 702 is performed by the matching engine processor (or another matching engine processor) on the resting orders of the CLOB. The matching process here is similar to that in step 326 of FIG. 3, but here the elect attributes of both sides of the order book are used for matches that make use of the hidden attributes of orders. Thus, with order 801 fulfilled, order 820 is resting in the order book at a price of 101 and can optionally execute at 100.5—one discretion tick away from its displayed price. In addition, as a result of having the spread shrink from 100-102 to 100-101, the effective price of midpoint order 803 is recalculated to 100.5. But, as discussed above, midpoint order 803 will not trade with orders from clients outside of group 3. In contrast, order 802 is another discretion order that, while displaying a price of 100, can execute at 100.5—one tick away from its displayed price. Unlike order 803 and order 801, order 802 (also an order from a client of market participant group 1) does not specify elect preferences and accordingly any contra-side order that satisfies the size, price, and/or other "hidden" attribute requirements will fulfill order 802. Here, order 820 satisfies the minimum size requirement and a match is identified between order 802 and order 820 at 100.5 for 500. This trade is executed using discretion and accordingly the result of the trade is not included in a public market data feed. There are no other orders that order 820 can match against and accordingly order 820 will remain in the CLOB with a displayed size of 75 at a displayed price of 101 with a total size of 500 and one tick of discretion execution.

In certain example embodiments (e.g., as discussed below), an order that has its total size completely (or partly) consumed at a discretion price may remain in the order book at the displayed price and size. For example, upon fulfilling 500 of order 801, order 801 may remain in the order book with a display size of 25 and a displayed price of 100. In certain example embodiments, a client can then modify this order to bring the "total" or reserve size of the order back up to 500 (or some other size that satisfies the minimum discretion size requirement.

Returning to FIG. 8B, order 830 shows another example of how the elect attribute can be used against the example order book shown in FIG. 8A. Order 830 does not have a specified elect attribute and was submitted by the same legal entity that submitted order 803 (e.g., in client group 1). Accordingly, in step 700 the matching engine will try to find a match at a price of 101. While order 803 indicates that 3 is one of its elect attributes (which is not the client type of the client that submitted order 830), it also has bit 15 as an elect attribute. Accordingly, order 803 can trade against orders from client group 3 (banks) and also other orders that have been submitted by that same client. Here, order 830 and 803 have been submitted by the same client and accordingly a match is identified between 803 and 830. This match will trade in the "dark" (nothing regarding this particular trade is generated on standard real-time market data feeds) as it is at the midpoint price.

After identifying this match, no further matches are found because order 801 will only trade with clients in group 2—which does not include the client that submitted order 830. Accordingly, order 830 will be added to the CLOB with a displayed price of 101, a displayed size of 100, and a total size of 100 (same as the displayed size).

In certain example embodiments, a client can modify attributes of a resting order. For example, after execution of order 830, a client may modify the total size of the order back up to 500 (while keeping the displayed size of 100). In certain example embodiments, such modifications will not affect the stack position of the order. In other words, even if the modification comes after other orders have been accepted and added to the order book at a price of 101, the timestamp of the modified order will remain unchanged (e.g., remain at 9). Thus, the discretion parts of an order (e.g., the hidden size) may be associated with the top or first stack position of the corresponding displayed part of the order that is already resting in the CLOB.

In other implementations, when an order is modified (e.g., to increase its size), the additional quantity is placed at the bottom of the order book. In other words, if client A submits a bid at 100 for 5 and client B then submits a bid at 100 for 10, and then client A modifies the original order with an additional 5, the "stack" of the order book may be 5, 10, and 5. Thus the second 5 that was input to "modify" the first order will be executed after the 10 from client B. However, as described herein, when hidden attributes of an order are modified the modifications as associated with the top position in the order book. Thus, in the above example, if the second 5 was a modification to the reserve or hidden portion of the first order it will execute before the 10 from client B.

In another example, and after the execution of order 830, the client of order 801 may cancel (or modify its elect attribute) so that a match may be identified between resting order 830 and resting order 801. In particular, in response to modifying (or canceling) the elect attribute of order 801, the exchange may run a matching process on the resting order book (e.g., the matching process described in step 702). In certain example embodiments, any action that touches or affects the state of the CLOB, may trigger execution of a matching process to determine if a match can be identified (e.g., as the state of the CLOB has changed).

In certain example embodiments, an order executed with discretion can be implemented as two or more separate orders that are linked. A first order will be an order with a displayed price and a displayed quantity. A second order may be an order that includes a hidden price and a hidden quantity. These two orders will be linked by the exchange 600. For example, the second order may include a parent order field that indicates the first order is its parent order. Accordingly, when a match is found with the second order it may correspond to the discussion herein of being at the discretion price of the first order. In certain example embodiments, when the displayed order (the first order) is fulfilled, then any child orders (e.g., the second order) are canceled.

In certain example embodiments, the exchange may track which orders are executed with discretion and apply and/or calculate a fee for the orders that received the benefit of the discretion. For example, a standard order (e.g., order 240) executed with discretion (e.g., against a contra-side order with discretion or a midpoint order) may have a discretion fee calculated and applied to it. In certain example embodiments, opposing discretionary orders that match/cross will each have a fee or surcharge calculated and applied. In certain example embodiments, opposing midpoint orders which match each other may each have a block surcharge calculated and applied. In certain example embodiments, different surcharges for using discretion and/or discretion that includes the elect attribute may be applied to both passive and taker orders for instruments offered by the exchange.

As explained above, the exchange may operate on a price/time basis. In certain example embodiments, the priority of how orders are matched may also be based on certain elect attributes. For example, an order with elect bit 15 (internal) that can execute against an order from the same client may be prioritize over an earlier submitted order from a different client that is at the same price.

In certain example embodiments, electronic data messages sent to the counter-parties may include a trade property attribute that identifies which group the counter-party for the executed trade belonged to. The electronic data message may include a flag that identifies which portion of the matched order was executed using elect and/or discretion properties.

Elect Reserve

In certain instances, order submitting clients may be concerned how their quotes impact the market. This may have an adverse side effect of clients reducing the size of orders posted to the CLOB to avoid attracting predatory activities. In certain example embodiments, clients can direct and/or limit a portion of their order to groups/categories of users (or legal entities) that they are more willing to trade with (e.g., such counter-parties may be understood to be less aggressive in nature).

In certain example embodiments, clients can indicate a reserve size (e.g., hidden size) for this order that is accessible only to qualified users (or legal entities) with an associated eligibility list (e.g., as described above and in FIG. 6). Elect reserve allows clients (e.g., liquidity providers) to "elect" eligible recipient client group(s) they wish to offer additional size. As with the above described elect discretion, these features may be applied on an instrument-by-instrument basis (e.g., not available on all instruments) that are traded on a given exchange (e.g., exchange 100 or exchange 600).

In certain example embodiments, the exchange can require a minimum show size for a newly submitted order with a hidden reserve size. Similarly, the exchange may require the reserve size to meet a minimum reserve size requirement. These two variables may be indicated by ElectMinimumShownSize and ElectMinimumReserveSize values and may vary on an instrument-by-instrument basis. If a client attempts to reduce a previously submitted valid order below either of these thresholds, the exchange may reject such modifications (or cancel the order).

Turning back to FIGS. 8A and 8B, consider the execution of order 840 against the CLOB shown in FIG. 8A (e.g., without modification based on the other examples discussed above). In this example, order 102 will match against order 812. Order 812 has a displayed size of 100, a reserve or hidden size of 1000 and indicates that contra-side orders from clients of type 1 (primary dealers) or 16 (GUI user) may access and trade with its hidden size. Order 840 has been submitted by client type 1 and accordingly the full reserve size of order 812 is eligible for trading. The result of this trade will be a trade for 500 at 102 and the reserve size of order 812 will be reduced to 500, while the displayed size remains at 100. As this trade used the elect attribute and was the result of accessing the reserve or hidden size of order 812, no public indication of the details of this trade will be sent out through a public real-time market data feed. Instead, details of the trade will be directly reported to the counter-parties for the trade. As explained below, aspects of this executed trade (e.g., the volume) may be included in a time-delayed report that is sent out on a rolling basis by the exchange.

Another example is shown in FIG. 8B if order 850 is executed against the CLOB shown in FIG. 8A. Order 850 is for the same amount as order 840. However, order 850 has been submitted by a client in group 2—a group that is not included in the elect attribute for order 812. Accordingly, the reserve size of order 812 is not available to order 850. As a result, only the displayed size of order 812 is available for trading and there will be a resulting match for 100 at 102 between order 850 and order 812 and then for 50 between order 850 and order 811. The remaining 350 of order 850 will be added to the bid side of the CLOB at 102 (note that this will result in order 803 becoming invalid as there is no valid bid/offer spread to base the midpoint on).

Another example of an example matching process is described in connection with order 860 in FIG. 8B. Here, order 860 has a displayed size of 100 and a total size of 500 (e.g., a reserve size of 400). When order 860 is received a matching process is performed that uses the elect attribute of order 860 ("1"). In this example, order 860 will execute against order 812 for its displayed size of 100 because order 812 is from client type 2, which is not the client group indicated by order 860's elect attribute. As a result of the executed trade between 812 and 860, the displayed size (100) of both orders has been fulfilled. In certain example embodiments, when the displayed size of an order is fulfilled, the remaining reserve size (if any) of the order is canceled. In certain instances, canceling the order may make it more difficult for counter-parties to infer the hidden size offered by order 812. In other words, the elected reserve portion of order 812 may not be re-clipped and posted to the CLOB.

The displayed size of order 860 is also 0 and thus this new order may also be canceled. In certain example embodiments, a new order that has its displayed size fulfilled may attempt to continue matching based only on the reserve size (and elect preferences). In other words, the matching engine processor, after matching 860 and 812, may determine that a match can also be executed between 811 and 860 because order 811 is of client type 1. In certain example embodiments, this match may be performed in the dark (e.g., because the reserve size of order 860 is being used). Alternatively, in certain example embodiments, the trade may be publically reported via real-time market data feeds because order 811 had a displayed size of 50. In certain example embodiments, public trade execution messages may be sent for the displayed size and not for the reserve size that has been executed (e.g., if order 811 had 100 total size, 50 would be publically reported and the other 50 would be in the dark).

In certain example embodiments, newly submitted orders that have a reserve size, but do not specify any elect preferences may be re-clipped (e.g., matched orders will "take" from the reserve portion and the remainder of the order will be displayed in the CLOB).

In certain example embodiments, an order that was submitted with elect reserve attributes will remain in the CLOB until the displayed size is exhausted or the order is canceled by the client. In certain example embodiments, even if the reserve size falls below the ElectMinimumReserveSize as a result of executed trades, the order will remain in the CLOB.

In certain example embodiments, if the reserve size (or other "private" property) of an order is modified by a client, the resting position of the order in the order book will not be affected. In certain example embodiments, if a reserve size (or other hidden property like a discretion price) is added to an existing order, the resting position of the modification will be associated with the displayed portion of the order. On the order hand, if the displayed size is changed, then the resting position of the order may be affected. In certain examples, the reserve portion of an order will maintain the position of the shown portion of the order.

In certain example embodiments, new orders that are from eligible groups (e.g., order 840 in FIG. 8B) for contra-side orders will match discretely against the reserve size of the contra-side order prior to matching against the displayed size. In certain example embodiments, the displayed size and the reserve size are independent sizes for an order. For example, order 812 may have a displayed size of 100 with a reserve size of 1000. Effectively, order 812 is offering 1100 at 102, but with only 100 being offered to any counter party.

In certain example embodiments, matches and the subsequent trades executed using discretion properties may be confirmed independently of trades executed in the standard or visible CLOB. For example, if an order is partly matched against some reserve size and a remainder of the displayed orders in the CLOB, the order submitting client may receive two confirmation messages for the execution of their single order. The first message may indicate what portion of the submitted order was executed using the reserve elements (or other hidden attributes) of the orders in the order book. The second may indicate that the remaining balance was executed against the displayed portion of the order book (e.g., if the new order matched against two different orders for a displayed price, those two matches may be reported as one trade.

In certain example embodiments, an order may satisfy and use elect reserve functionality and elect discretion functionality. In certain example embodiments, a trade executed using a discretion price will use the reserve size of a contra-side order before hitting the displayed size. In certain example embodiments, a trade executed at a lit price when a counter party satisfies the elect attribute requirement of the other order will use the reserve portion of the order before hitting the displayed size. In certain example embodiments, a trade executed at a lit price where one order is not eligible according to the elect attribute of the contra-order uses the lit or displayed size of the order and will not re-clip from the reserve size of the order.

Volume Reporting

As discussed herein, when an order is executed using a hidden or dark property (e.g., with discretion, midpoint orders, elect reserve, elect discretion, and/or elect midpoint orders) the results of the executed trades will not be made publically available through standard electronic market data feeds. In certain example embodiments, an exchange may publish the volume associated with these "dark" transactions on a delayed and/or configurable basis. In certain example embodiments, an exchange may define a configurable option on an exchange, instrument, or instrument group basis.

In certain example embodiments, an exchange may define a value (e.g., a "dark volume delay" property) that indicates the amount of time between when a dark trade has occurred and when the volume of that trade is included in a volume report. For example, if the dark volume delay is set to 5, then the every 5 minutes the computer system will update the "real-time" total "lit" volume with the volume that occurred in the "dark" minus 5 minutes. The volume that is reported in this manner is reported without any indication of price.

For example, an exchange may offer an instrument (e.g., 2 year U.S. treasury) and the exchange may provide real-time updates of the volume for that instrument throughout the day. Accordingly, if the real-time volume for an instrument is 300, and the reporting period for "dark" trades from 5 to 10 minutes ago indicates that 50 was traded in the dark. The exchange may provide an indication that the "real-time" volume is 300+50 volume (as of the current time minus 5 minutes). The delayed volume number may be updated as the "real-time" number is updated. In other words, the exchange may continually provide a report of how much hidden volume was transacted between 5 and 10 minutes from the current time period.

In certain example embodiments, the volume reported is a delayed total dark volume. Thus, the "real-time" lit total (e.g., for that trading day) volume may be reported with the total "dark" volume minus 5 minutes ago for that trading day. Naturally, the time period is configurable and may be, for example, any value between 1 minute and 1 hour or even 1 second and 1 day (or greater).

In certain example embodiments, these two volume numbers are provided separately. In certain example embodiments, the exchange will simply add one number to the other and report the result with no indication as to how much of the volume is due to "dark" transactions and "lit" transactions.

In certain example embodiments, the operator of the exchange may have a configurable property to enable and disable such volume reporting on at least an instrument-by-instrument basis.

In certain example embodiments, a computer system may not maintain dark volume separately for failover purposes. In certain example embodiments, a trading system will continue to maintain total volume traded that will be total lit volume plus total dark volume (as of a delayed time period). In other words, volume traded in the "dark" may only stay "dark" for continuation of the current session. With the start of the new trading session, the total volume is combined and the dark volume is reset.

Thus, during a failover event (e.g., soft, hard, or disaster recovery event) the system will report, for conflated and real time market data, the volume reported will be the total traded volume up to the event that includes lit and dark just prior to failover. In certain instances, a market data feed that provides volume information (e.g., such as the ITCH protocol), may restart from zero.

Technical Advantages of Described Subject Matter

In certain example embodiments, the subject matter described herein provides for a more unified handling of pending and received data transaction requests by utilizing a single (per identifier) dual-sided ordered list (an order book) for match processing of the data transaction requests. The techniques described herein may thus allow for more efficient processing and allowing an exchange to identify more matches between data transaction requests. In certain example embodiments, an exchange computing system may find potential matches between different types of data transaction requests.

As noted above, the technical matching implementation may have the following benefits. First, the search space for finding a match is initially reduced as the aggressing order is processed using its public price. Second, the techniques also protect passive orders that have multiple ticks of discretion. Accordingly, an order will not give up significantly more value than what the aggressing party was willing to trade at. Third, in certain examples, the aggressing order may be awarded with one tick of discretion (e.g., a better price than that at which the order would have been matched at). Fourth, while the aggressing order may leave a little bit of price difference (e.g., it may have gotten "more" in another scenario) and the resting order may pay up (or down) more than just the displayed price—on balance for both orders will have improvements over what they otherwise would have been matched at.

The techniques herein may facilitate the identification of more matches than would otherwise be identified. These techniques may be useful where the public values of data transaction requests in the ordered lists do not fluctuate very much as the private values may be used to for identifying matches.

Selected Terminology

Whenever it is described in this document that a given item is present in "some embodiments," "various embodiments," "certain embodiments," "certain example embodiments," "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Individual function or process blocks are shown in the figures. Those skilled in the art will appreciate that the functions of those blocks may be implemented using individual hardware circuits, using software programs and data in conjunction with a suitably programmed hardware, using applications specific integrated circuitry (ASIC), and/or using one or more digital signal processors (DSPs). The software program instructions and data may be stored on non-transitory computer-readable storage medium and when the instructions are executed by a computer, or other suitable hardware processor, control the computer or hardware processor to perform the functionality defined in the program instructions.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., a processor and those input devices and output devices that are appropriate to perform the process.

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A computing system for processing different types of data transaction requests, the computing system comprising:
   non-transitory memory configured to store a first plurality of pending data transaction requests associated with a first list and a second plurality of pending data transaction requests associated with a second list, wherein at least a first data transaction request of the first and second plurality of pending data transaction requests includes a public value for matching and a private discretion attribute that corresponds to at least one discretion increment for matching at a private value that is different than the public value; and
   a processing system that includes at least one hardware processor coupled to the non-transitory memory, the processing system configured to:
      receive at least a second data transaction request;
      based on reception of the second data transaction request, perform a first matching process by using the second data transaction request against the first plurality of pending data transaction requests that are associated with the first list by using a public value of the second data transaction request, wherein the first plurality of pending data transaction requests are sorted according to at least one private value;
      after performance of the first matching process and based on the second data transaction request having an unmatched quantity, add the second data transaction request with the unmatched quantity to the second plurality of pending data transaction requests;
      perform a second matching process to match at least one data transaction request from the first plurality of pending data transaction requests to at least one data transaction from the second plurality of pending data transaction requests, which includes the second data transaction request with the unmatched quantity, the second matching process using at least one private value that is based on different ones of the data transaction requests of the first and/or second plurality of pending data transaction requests;
      based on matching at least two data transaction requests from the first and second plurality of pending data transaction requests at a public value, publish details of the match to a public real-time electronic data feed that is received by third parties; and
      based on matching at least two data transaction requests from the first and second plurality of pending data transaction requests at a private value, do not publish details of the match to the public real-time electronic data feed.

2. The computing system of claim 1, wherein the processing system is further configured to:
   in association with the second matching process, calculate a midpoint value based on a calculated difference between a public value associated with the first list and a public value associated with the second list,
   wherein the calculated midpoint value is used as the at least one private value during the second matching process.

3. The computing system of claim 1, wherein the processing system is further configured to:
   receive a third data transaction request that includes a midpoint attribute and a quantity value; and
   as a result of determining that the third data transaction request includes the midpoint attribute, bypass the first matching process and add the third data transaction request to the first or second plurality of pending data transaction requests,
   wherein the second matching process is performed using a dynamically calculated midpoint value for the least one private value that is used for determining if there is a match for the third data transaction request as part of the second matching process.

4. The computing system of claim 1, wherein the first data transaction request includes a quantity value, where a first portion of the quantity value is matched as a result of the first matching process and a second portion is matched as a result of the second matching process,
   where the first portion is matched at the public value of the second data transaction request during the first matching process without taking into account the private discretion attribute of the first data transaction request,
   where the second portion is matched by taking into account the private discretion attribute.

5. The computing system of claim 1, wherein a third data transaction request is included in the first plurality of pending data transaction requests when the second data transaction request is processed using the first matching process and the second matching process,
   where a first calculated midpoint value is used to sort the third data transaction request as part of the first plurality of pending data transaction requests for the first matching process,
   where a second calculated midpoint value is used for the private value of the third data transaction request during the second matching process that includes the second data transaction request.

6. The computing system of claim 1, wherein the first plurality of pending data transaction requests is sorted for the first matching process based on a type of the second data transaction request.

7. The computing system of claim 1, wherein the processing system is further configured to:
   enforce a quantity value threshold on data transaction requests with discretion and/or midpoint attributes, where only those data transaction requests that meet the quantity value threshold are eligible for matching at a private value.

8. The computing system of claim 1, wherein:
   in accordance with the first matching process, only sending details of matches to public third parties when a match is determined at a value that is public for all data transaction requests that are part of the match.

9. The computing system of claim 1, wherein the processing system is further configured to:
enforce a quantity threshold on data transaction requests that are eligible to match at a private values.

10. The computing system of claim 1, wherein the processing system is further configured to set a third data transaction request, which includes a midpoint attribute, as inactive if either the first list or the second list is not associated with any other pending data transaction requests.

11. A method of matching different types of data transaction requests by a computer system that includes electronic memory, a transceiver, and a processing system that includes at least one processor coupled to the electronic memory and the transceiver, the method comprising:
storing, to the electronic memory, at least a first plurality of pending data transaction requests associated with a first list and a second plurality of pending data transaction requests associated with a second list, wherein at least a first data transaction request of the first plurality of pending data transaction requests includes a public value for matching and a private discretion attribute that corresponds to at least one discretion increment for matching at a private value that is different than the public value;
receiving, via the transceiver, a second data transaction request that includes a quantity for matching;
performing a first matching process that attempts to match, by using a public value of the second data transaction request, the second data transaction request against at least one of the first plurality of pending data transaction requests that are associated with the first list, wherein the first plurality of pending data transaction requests are sorted according to associated private values;
after performing the first matching process and based on the second data transaction request having an unmatched quantity from the first matching process, adding the second data transaction request with the unmatched quantity to the second plurality of pending data transaction requests;
after addition of the second data transaction request, performing a second matching process to match at least one data transaction request that is associated with the first list to at least one data transaction request that is associated with the second list, the second matching process using at least one private value that is based on the pending data transaction requests associated with the first list and/or the second list;
based on matching at least two data transaction requests at a public value that is associated with the first list or the second list, publishing details of the match to a public real-time electronic data feed that is consumed by third parties; and
based on matching at least two data transaction requests at a private value associated with the first list or the second list, bypassing publishing details of the match the public real-time electronic data feed and publishing details of the match to computer devices associated with participants of the match.

12. The method of claim 11, further comprising:
calculating a midpoint value based on a calculated difference between a public value associated with the first list and a public value associated with the second list, wherein the calculated midpoint value is used as at least one private value to sort the first plurality of pending data transaction requests.

13. The method of claim 11, further comprising:
receiving a third data transaction request that includes a midpoint attribute and a private quantity value; and
as a result of determining that the third data transaction request includes the midpoint attribute, skipping the first matching process and adding the third data transaction request to the first or second plurality of pending data transaction requests,
wherein the second matching process is performed using a dynamically calculated midpoint value for the least one private value that is used for determining if there is a match for the third data transaction request as part of the second matching process.

14. The method of claim 11,
wherein the first data transaction request includes a quantity value, where a first portion of the quantity value is matched as a result of the first matching process and a second portion is matched as a result of the second matching process,
where the first portion is matched at the public value of the second data transaction request during the first matching process without taking into account the private discretion attribute of the first data transaction request,
where the second portion is matched by taking into account the private discretion attribute of the first data transaction request.

15. The method of claim 11, further comprising:
processing a third data transaction request, which includes a midpoint attribute, before the second data transaction request is received,
wherein a first calculated midpoint value is used to sort the third data transaction request as part of the first plurality of pending data transaction requests for the first matching process,
wherein a second calculated midpoint value is used for the private value of the third data transaction request during the second matching process that includes the second data transaction request.

16. The method of claim 15, further comprising:
setting the third data transaction request as inactive if either the first list or the second list is not associated with any other pending data transaction requests.

17. The method of claim 11, further comprising:
enforcing a quantity value threshold on data transaction requests that are eligible to match at a private value.

18. A non-transitory computer readable storage medium having stored thereon computer readable instructions for use with a computer system that includes electronic memory configured to store at least a first plurality of pending data transaction requests associated with a first list and a second plurality of pending data transaction requests associated with a second list, wherein at least a first data transaction request of the first plurality of pending data transaction requests includes a public value for matching and a private discretion attribute that corresponds to at least one discretion increment for matching at a private value that is different than the public value, the stored computer readable instructions comprising instructions that cause the computer system to perform operations comprising:
receiving, via a transceiver, a second data transaction request that includes a quantity for matching;
performing a first matching process that attempts to match, by using a public value of the second data transaction request, the second data transaction request against at least one of the first plurality of pending data transaction requests that are associated with the first list, wherein the first plurality of pending data transaction requests are sorted by taking into account associated private values;

after performing the first matching process and based on the second data transaction request having an unmatched quantity from the first matching process, adding the second data transaction request with the unmatched quantity to the second plurality of pending data transaction requests;

after addition of the second data transaction request, performing a second matching process to match at least one data transaction request that is associated with the first list to at least one data transaction request that is associated with the second list, the second matching process using private values of pending data transaction requests associated with the first list and/or the second list;

based on matching at least two data transaction requests at a public value that is associated with the first list or the second list, publishing details of the match to a public real-time electronic data feed that is consumed by third parties; and based on matching at least two data transaction requests at a private value associated with the first list or the second list, bypassing publishing details of the match the public real-time electronic data feed and publishing details of the match to computer devices associated with participants of the match.

19. The non-transitory computer readable storage medium of claim 18, wherein the operations further comprise:
calculating a midpoint value based on a calculated difference between a public value associated with the first list and a public value associated with the second list, wherein the calculated midpoint value is used as at least one private value to sort the first plurality of pending data transaction requests.

20. The non-transitory computer readable storage medium of claim 18, wherein the operations further comprise:
receiving a third data transaction request that includes a midpoint attribute and a private quantity value; and
as a result of determining that the third data transaction request includes the midpoint attribute, skipping the first matching process and adding the third data transaction request to the first or second plurality of pending data transaction requests,
wherein the second matching process is performed using a dynamically calculated midpoint value for the least one private value that is used for determining if there is a match for the third data transaction request as part of the second matching process.

* * * * *